US007630112B2

(12) United States Patent  (10) Patent No.: US 7,630,112 B2
Mizumoto                                       (45) Date of Patent:     Dec. 8, 2009

(54) IMAGE DISPLAY APPARATUS

(75) Inventor: Kenji Mizumoto, Osaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/120,474

(22) Filed: May 14, 2008

(65) Prior Publication Data

US 2008/0285103 A1    Nov. 20, 2008

(30) Foreign Application Priority Data

May 15, 2007   (JP)   ............... 2007-129304
Mar. 26, 2008  (JP)   ............... 2008-080721

(51) Int. Cl.
*G02B 26/08*   (2006.01)
(52) U.S. Cl. .................. 359/199.1; 359/224
(58) Field of Classification Search ............. 359/199.1, 359/223–226
See application file for complete search history.

(56) References Cited

U.S. PATENT DOCUMENTS 7,098,871 B1     8/2006  Tegreene et al. ............... 345/7
7,385,745 B2 *   6/2008  Ishihara ..................... 359/202.1
2006/0268668 A1* 11/2006  Lee et al. .................... 369/44.11

FOREIGN PATENT DOCUMENTS

JP    2003-513332 A    4/2003

* cited by examiner

*Primary Examiner*—Euncha P Cherry
(74) *Attorney, Agent, or Firm*—Sidley Austin LLP

(57) ABSTRACT

An image display apparatus includes first and second actuators that cause a mirror (movable part) to oscillate about first and second axes intersecting with each other. The first actuator is driven based on a drive signal having a frequency component around a resonant frequency relevant to oscillatory motion of the mirror, to cause the mirror to oscillate about the first axis, thereby scanning a light beam reflected off the mirror in a horizontal direction of the raster scanning. The drive signal is generated by regulating a reference drive signal based on a correction signal for use in correcting distortion of a displayed image, the distortion occurring when the first actuator is driven based on the reference drive signal for use as the drive signal to cause oscillatory motion of the mirror. This consequently simplifies distortion correction in the horizontal direction (the main scanning direction).

18 Claims, 17 Drawing Sheets

F I G . 1
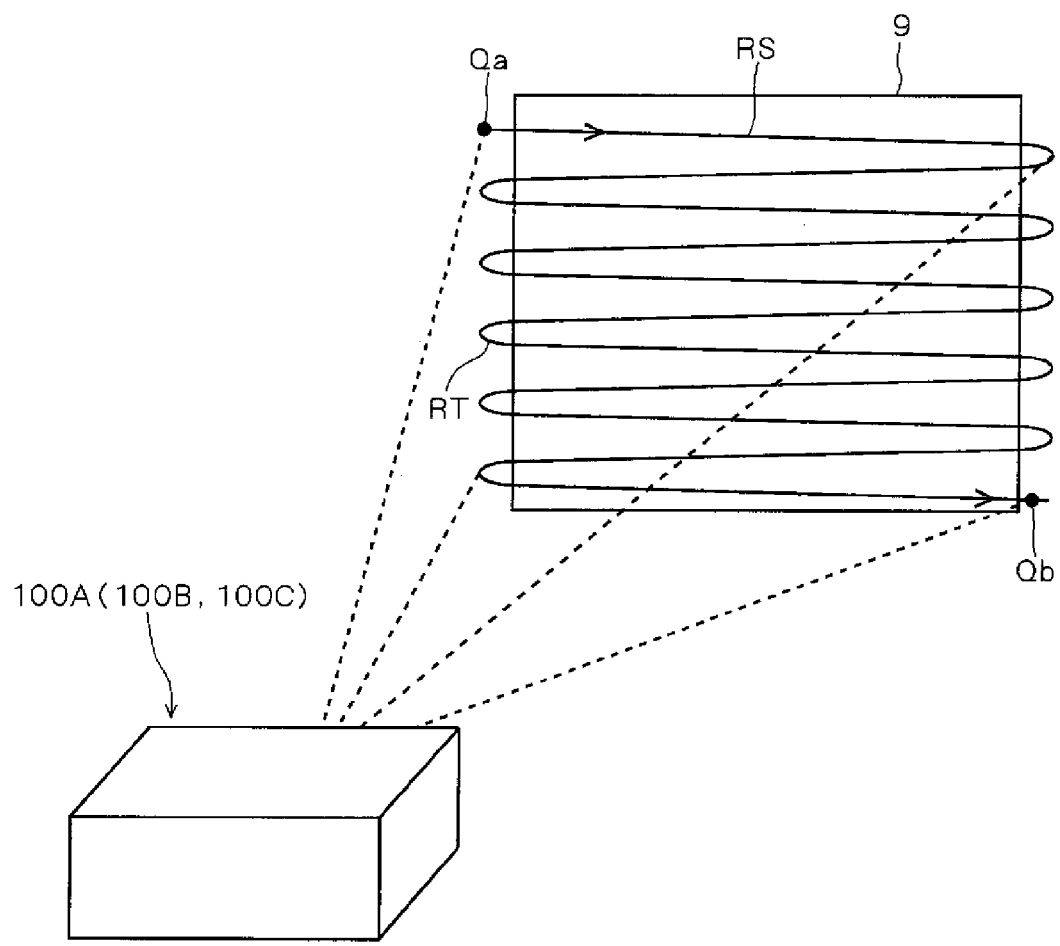

F I G . 2 2
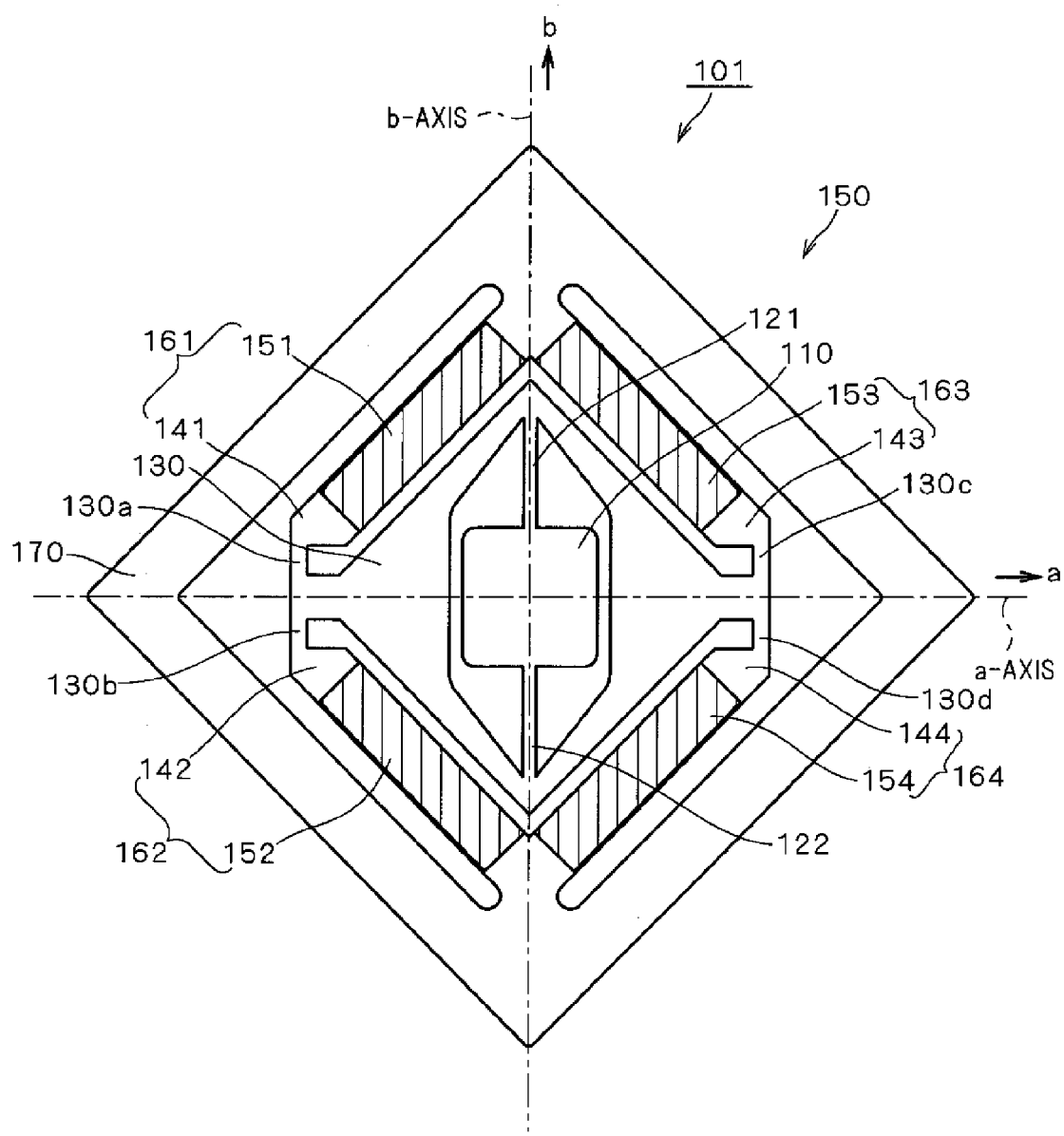

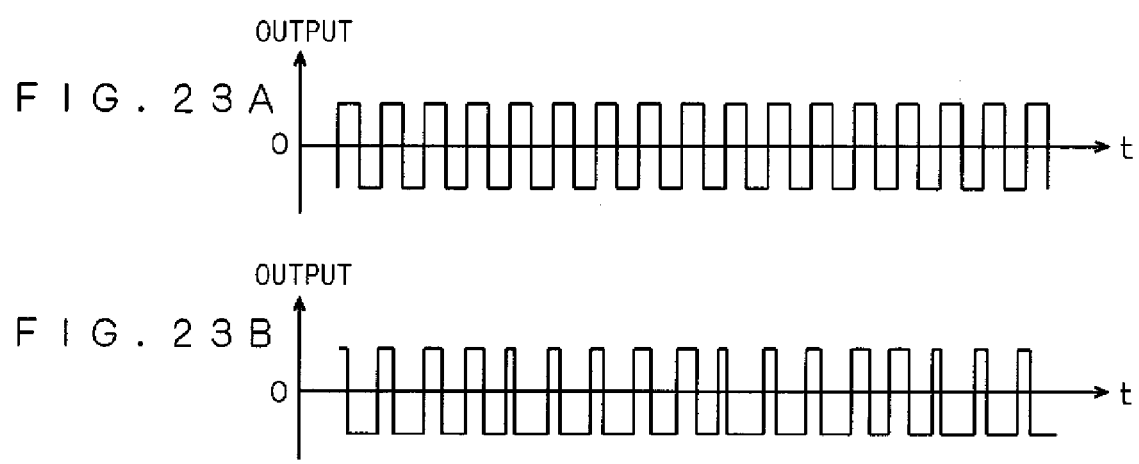

IMAGE DISPLAY APPARATUS

This application is based on Application Nos. 2007-129304 and 2008-080721 filed in Japan, the contents of which are hereby incorporated by reference.

BACKGROUND OF THE INVENTION

1. Field of the Invention

The present invention relates to an image display apparatus capable of displaying an image on a given plane of projection by beam raster scanning.

2. Description of the Background Art

Optical scanners deflecting and scanning light beams such as laser beams are utilized for optical equipment such as a barcode reader, a laser printer, and a display. Some such optical scanners include a polygon mirror scanning reflected light by rotation of a polygonal shaped mirror with a motor, a galvano-mirror causing a plane mirror to rotate and oscillate with an electromagnetic actuator, or the like. Such optical scanners require mechanical drive mechanisms for driving a mirror with a motor or with an electromagnetic actuator; however, such drive mechanisms are relatively large in size and expensive, inhibiting miniaturization of the optical scanners and increasing the cost thereof.

For miniaturization, cost reduction, and improved productivity of optical scanners, development of micro optical scanners where components such as mirrors and elastic beams are molded in one piece is now in progress using micromachining technologies for micromachining silicon or glass with application of semiconductor manufacturing technologies.

There is an image display apparatus which is provided with two such optical scanners as described above and displays a two-dimensional image on a plane of projection by raster scanning of light beams reflected off mirrors of those scanners.

This kind of image display apparatus suffers from a tapering phenomenon during raster scanning, which is so-called raster pinch, due to oscillatory drive of the mirrors in a horizontal scanning direction. The raster pinch is, however, vertical distortion of a displayed image and thus can be reduced by electrical correction of distortion in vertical scanning (see for example, Published Japanese Translation of PCT International Application No. 2003-513332).

In the image display apparatus described above, it is ideal that the trajectory of scanning lines describe a rectangle with a prescribed aspect ratio (cf. (b) in FIG. 12), but such a rectangle may in some cases be distorted (cf. (a) in FIG. 12) depending on the properties of optical devices employed, the angle of the plane of projection relative to light beams, or the like. One technique for correcting such distortion in raster scanning in a horizontal scanning direction (main scanning direction) is, for example, a distortion correction technique using optical devices with optical properties of canceling distortion.

However, this distortion correction technique needs installation of the optical devices described above, complicating the configuration and causing an increase in the size and cost of the image display apparatus as a whole.

SUMMARY OF THE INVENTION

The present invention is directed to an image display apparatus capable of displaying an image on a given plane of projection by beam raster scanning.

According to the invention, the image display apparatus includes (a) an actuator part capable of causing a movable part to oscillate about a first axis and a second axis, said movable part having a reflecting surface reflecting a light beam emitted from a given light source, said second axis intersecting with said first axis at approximately a right angle; and (b) a main scanning unit driving the actuator part based on a drive signal having a frequency component around a resonant frequency relevant to oscillatory motion of the movable part, to cause the movable part to oscillate about the first axis, thereby scanning the light beam reflected off the reflecting surface in a main scanning direction of the raster scanning. The main scanning unit includes: (b-1) a correction-signal generator generating a correction signal for use in correcting distortion of a displayed image on a given plane of projection, the distortion occurring when the actuator part is driven based on a reference drive signal for use as the drive signal, to cause the movable part to oscillate about the first axis; and (b-2) a regulator regulating the reference drive signal based on the correction signal to generate the drive signal. The image display apparatus further includes: (c) a sub-scanning unit driving the actuator part to cause the movable part to oscillate about the second axis, thereby scanning the light beam reflected off the reflecting surface in a sub-scanning direction of the raster scanning.

This simplifies distortion correction in the main scanning direction in raster scanning.

Preferably, in the image display apparatus, a dominant frequency band fc relevant to frequency components of the correction signal satisfies: $fc \approx fom/(2Q)$ or $fc < fom/(2Q)$, where fom is the resonant frequency and Q is a quality factor representing a resonance characteristic relevant to the resonant frequency.

This allows high-precision distortion correction in the main scanning direction.

It is therefore an object of the invention to provide an image display apparatus that simplifies distortion correction in the main scanning direction in raster scanning.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view of an image display apparatus according to a first preferred embodiment of the invention;

FIG. 22 is a plan view showing a configuration of the essential parts of an optical scanner according to a third preferred embodiment of the invention; and FIGS. 23A and 23B are diagrammatic illustrations of a reference drive signal of a rectangular waveform according to a modification of the invention.

DESCRIPTION OF THE PREFERRED EMBODIMENTS

First Preferred Embodiment

<Configuration of Image Display Apparatus>

FIG. 1 is an external view of an image display apparatus 100A according to a first preferred embodiment of the invention.

The image display apparatus 100A has a box-like shape and is configured as a projector that projects video (images) onto a screen 9. This image display apparatus 100A performs raster scanning RS of light beams emitted onto the screen 9 which is a plane of projection, thereby allowing a display of two-dimensional images on the screen 9. The raster scanning RS completes one image display by continuous scanning of light beams, for example from the start position Qa at the top of a displayed image to the end position Qb at the bottom of the displayed image.

Figure 2:
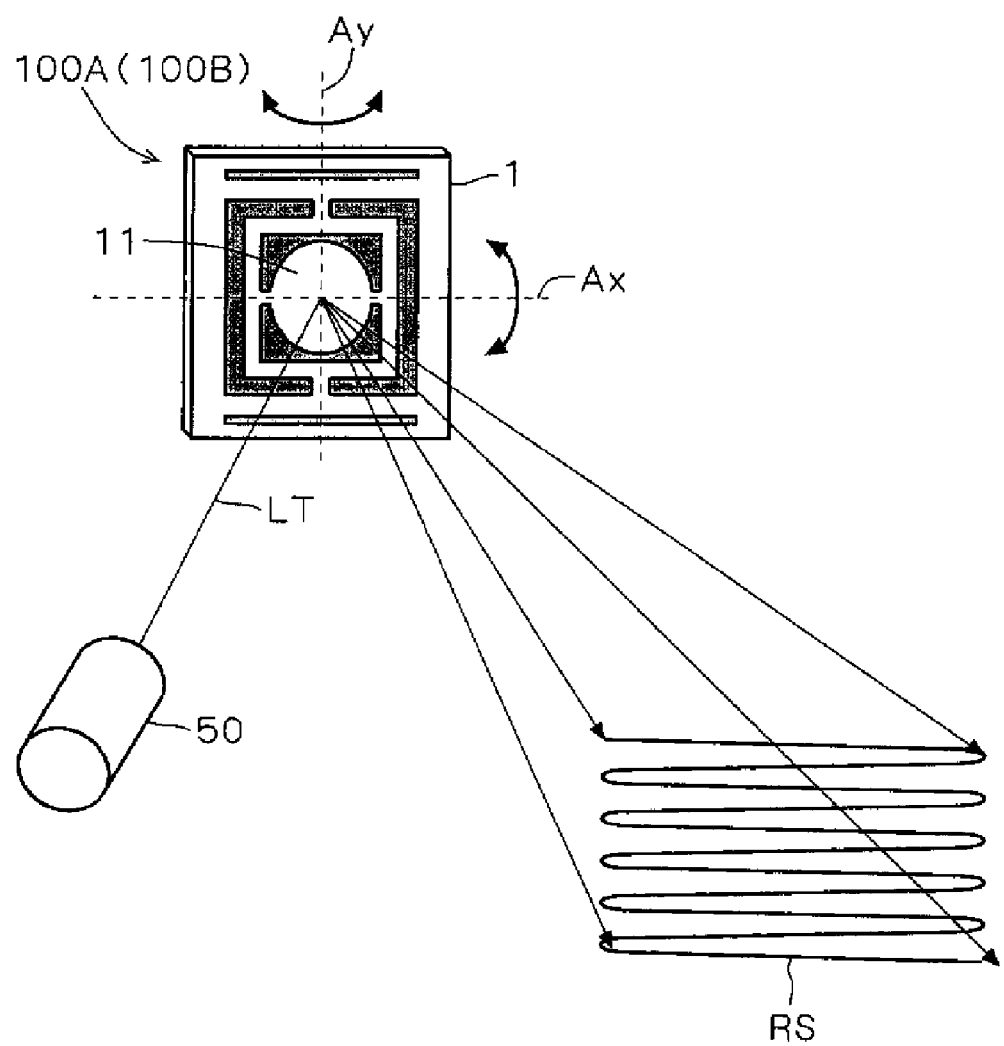
FIG. 2 is a diagrammatic illustration of the relative positions of an optical scanner and a light source.

The image display apparatus 100A is provided therein with an optical scanner 1 shown in FIG. 2 and a light source 50 emitting a light beam (e.g., a laser beam) LT toward the optical scanner 1.

The optical scanner 1 includes a mirror 11 that is rotatable about a first axis Ay parallel to the Y axis (cf. FIG. 4) and about a second axis Ax parallel to the X axis (cf. FIG. 4), the second axis AX intersecting with the first axis Ay at approximately a right angle. Two-dimensional rotation of this mirror 11 about the first and second axes Ay and Ax allows the raster scanning RS of the light beam LT emitted from the light source 50 and reflected off the mirror 11. A concrete configuration of the optical scanner 1 is described later in detail.

Figure 3:
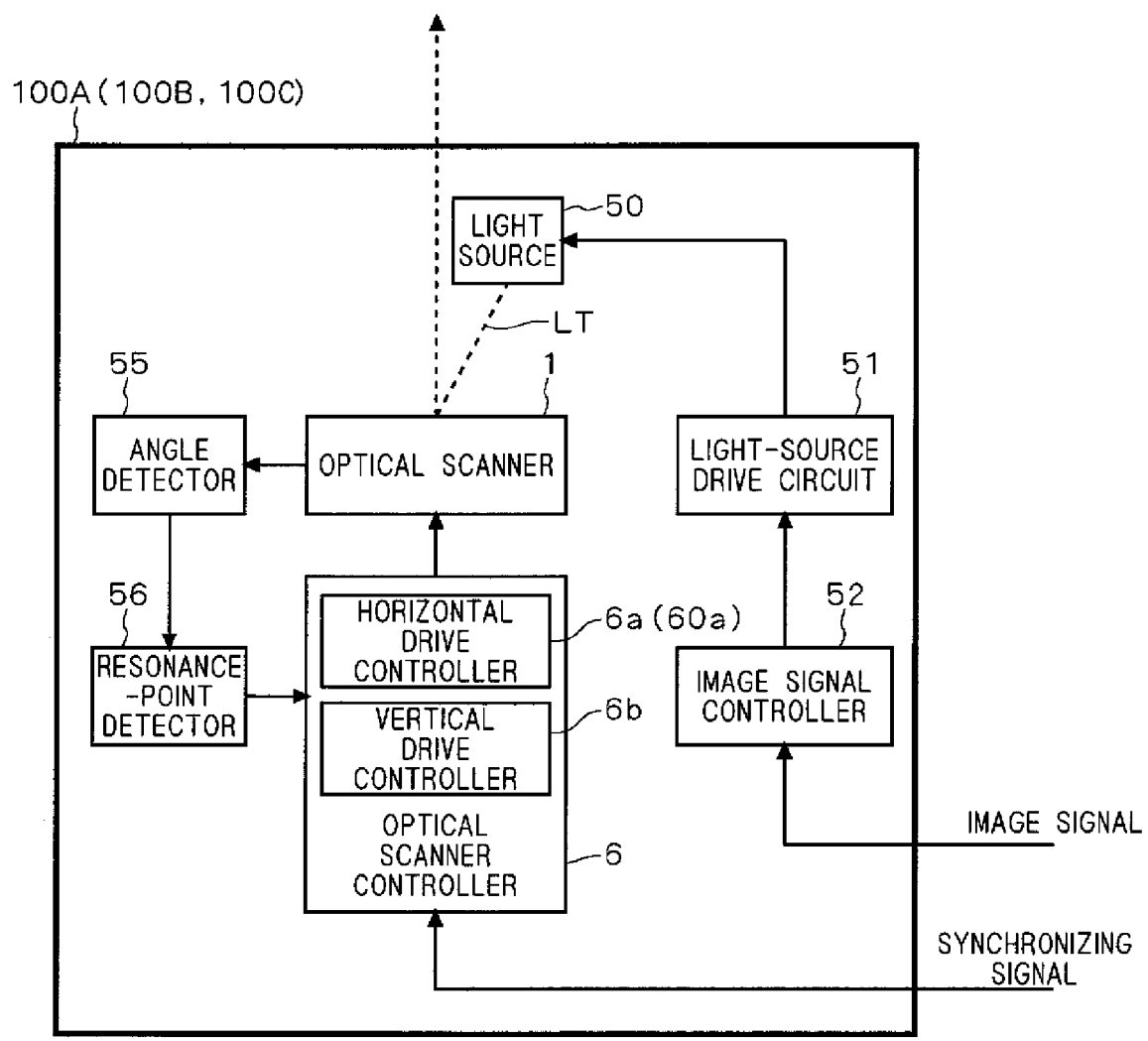
FIG. 3 is a block diagram showing a functional configuration of the image display apparatus.

FIG. 3 is a block diagram showing a functional configuration of the image display apparatus 100A.

The image display apparatus 100A includes, in addition to the optical scanner 1 and the light source 50 described above, an optical-scanner controller 6 performing drive control of the optical scanner 1; a light-source drive circuit 51 driving the light source 50; and an image-signal controller 52 controlling the light-source drive circuit 51.

The optical-scanner controller 6 includes a horizontal drive controller 6a controlling rotation of the mirror 11 about the first axis Ay (FIG. 2), i.e., horizontal drive; and a vertical drive controller 6b controlling rotation of the mirror 11 about the second axis Ax (FIG. 2), i.e., vertical drive. The horizontal drive controller 6a is described later in detail.

The image-signal controller 52 generates a control signal for controlling the light source 50, for example based on an image signal input from the outside of the image display apparatus 100A. Controlling, based on this control signal, the light source 50 (such as light on/off control and luminescence intensity control) through the light-source drive circuit 51 provides a proper image display based on the input image signal, on the screen 9.

The image display apparatus 100A further includes an angle detector 55 detecting the angle of the mirror 11 that oscillates about the first axis Ay (FIG. 2); and a resonance-point detector 56 detecting a resonance point (resonant frequency) of oscillatory motion of the mirror 11 based on the angle detected in the angle detector 55.

The angle detector 55, for example based on an output signal from a displacement-angle sensor such as a piezoelectric element attached to a torsion bar (described later), detects a displacement angle of the mirror 11 with respect to oscillation about the first axis Ay in the Y-axis direction.

The following description is given of a configuration of the essential parts of the optical scanner 1.

<Configuration of Essential Parts of Optical Scanner 1>

Figure 4:
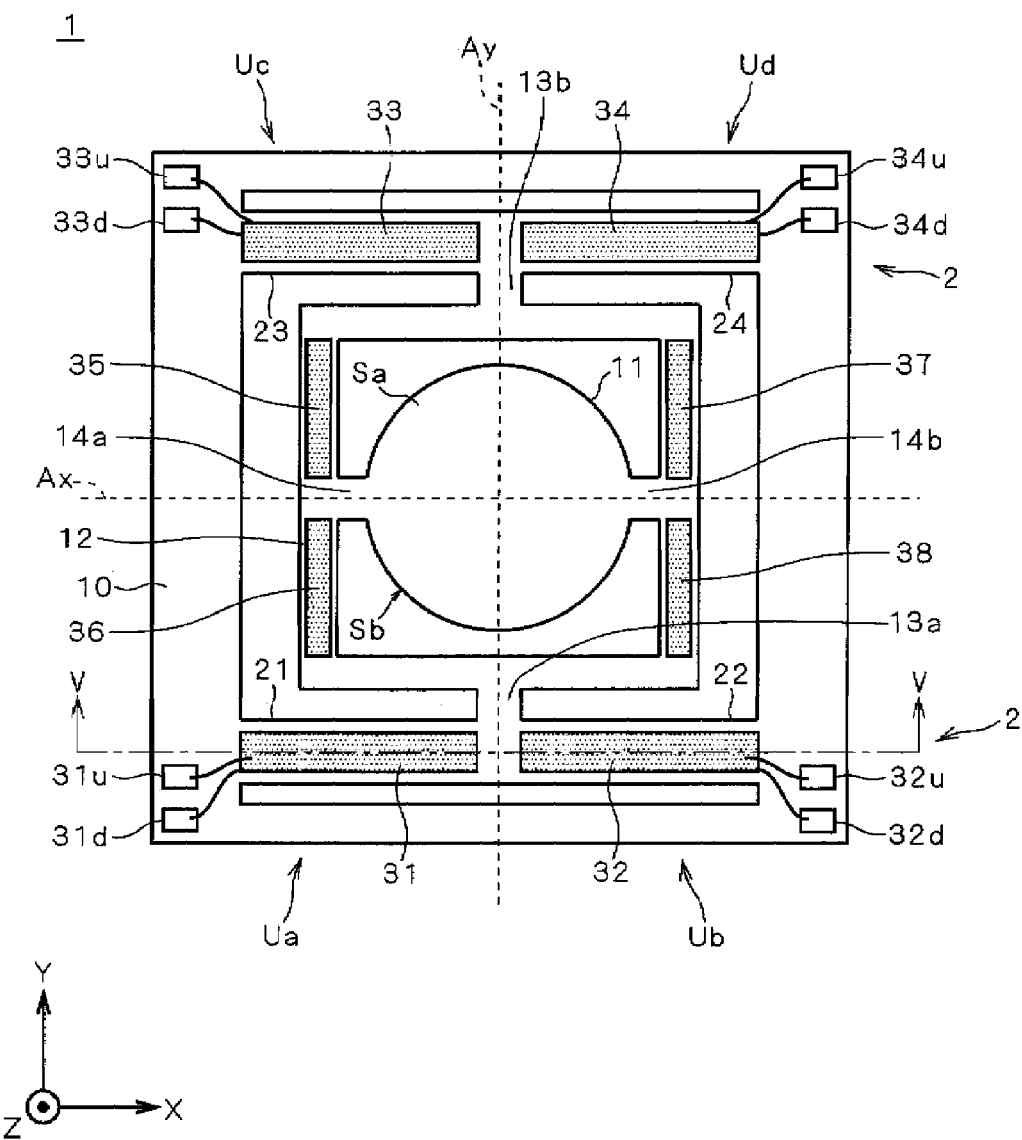
FIG. 4 is a plan view showing a configuration of the essential parts of the optical scanner.
Figure 5:
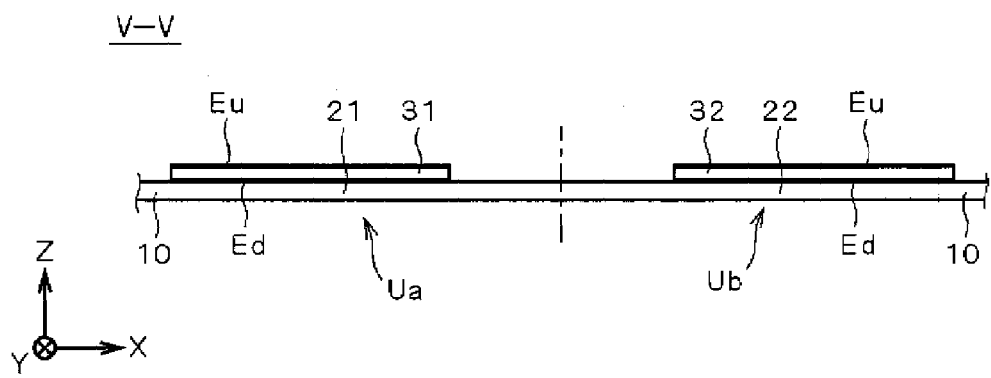
FIG. 5 is a cross-sectional view taken along line V-V in FIG. 4.

FIG. 4 is a plan view showing a configuration of the essential parts of the optical scanner 1. FIG. 5 is a cross-sectional view taken along line V-V in FIG. 4.

The optical scanner 1 includes a frame 10 of a hollow, square-shaped plate member fixed to a casing or the like, not shown; and a hollow, square-shaped holding member 12 contained in the frame 10 and resiliently holding the mirror 11. In the optical scanner 1, elastically deformable torsion bar parts 13 (13a, 13b) and 14 (14a, 14b) provide the coupling between the holding member 12 and the frame 10 through a vibrator 2 and the coupling between the mirror 11 and the holding member 12.

The mirror 11 has a disc-like shape, and its front and back sides Sa and Sb serve as reflecting surfaces reflecting the light beam LT emitted from the light source 50. Specifically, the front and back sides Sa and Sb of the mirror 11 have formed therein a reflection film of thin metal film such as gold or aluminum (Al), so it is configured to improve the reflectance of an incident light beam.

The torsion bar part 13 includes two torsion bars 13a and 13b extending from the holding member 12 to the vibrator 2 along the first axis Ay of the mirror 11, parallel to the Y axis. The presence of this torsion bar part 13 allows the holding member 12 holding the mirror 11 to be resiliently supported by the vibrator 2.

Similarly, the torsion bar part 14 includes two torsion bars 14a and 14b extending from both sides of the mirror 11 to the holding member 12 along the second axis Ax of the mirror 11, the second axis in parallel with the X axis.

The vibrator 2 includes bending beams 21 and 22 of plate members connected to the torsion bar 13a; and bending beams 23 and 24 of plate members connected to the torsion bar 13b. These bending beams 21 to 24, the frame 10, the mirror 11, the holding member 12, and the torsion bars 13a, 13b, 14a, and 14b are integrally formed by anisotropic etching of, for example, a silicon substrate.

The vibrator 2 further includes piezoelectric elements 31 to 34 as electromechanical transducers attached, for example with an adhesive, to the upper surfaces of the bending beams 21 to 24, respectively. The piezoelectric elements 31 to 34 are piezoelectric vibrators (piezoelectric actuators) causing the mirror 11 to oscillate about the first axis Ay. The piezoelectric elements 31 to 34 and the bending beams 21 to 24 form four unimorphs Ua, Ub, Uc, and Ud.

The piezoelectric elements 31 to 34 each have an upper electrode Eu and a lower electrode Ed on their front and back sides, respectively (cf. FIG. 5). The upper electrodes Eu of the piezoelectric elements 31 to 34 are electrically connected respectively to electrode pads 31u to 34u provided on the frame 10, for example through wires; and the lower electrodes Ed of the piezoelectric elements 31 to 34 are electrically connected respectively to electrodes pads 31d to 34d provided on the frame 10, for example through wires. These electrode pads allow the application of drive voltage to each of the piezoelectric elements 31 to 34 from the outside of the optical scanner 1.

In the optical scanner 1 with the above-described configuration, the application of drive voltage to the piezoelectric elements 31 to 34 through the electrode pads 31u to 34u and 31d to 34d induces bending deformation of the bending beams 21 to 24. The bending of the bending beams 21 to 24 gives the mirror 11a rotary torque acting around the first axis Ay, through the torsion bars 13a and 13b and the holding member 12, thereby causing the mirror 11 as a movable part to oscillate about the first axis Ay. This oscillatory motion of the mirror 11 is now described in detail.

Figure 6A:
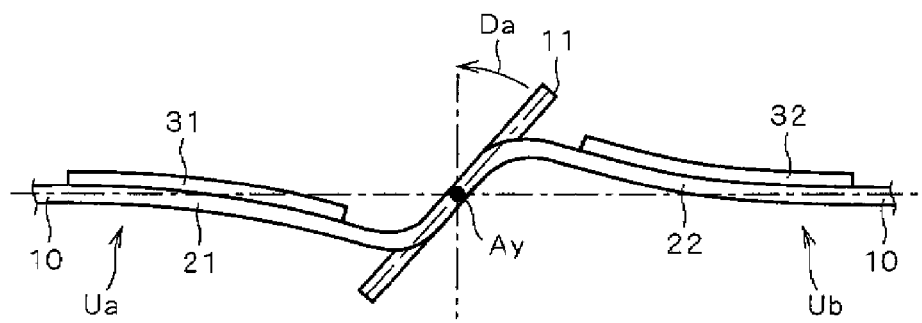
FIGS. 6A and 6B are diagrammatic illustrations of oscillatory motion of a mirror.
Figure 6B:
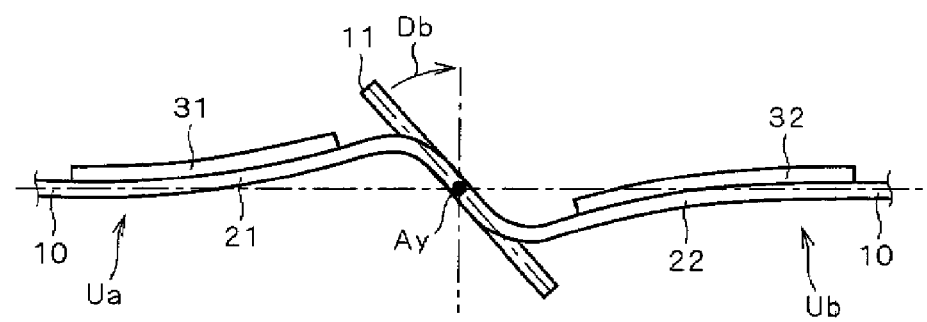

FIGS. 6A and 6B are diagrammatic illustrations of the oscillatory motion of the mirror 11 and correspond to FIG. 5 showing a cross-section when viewed from the position of line V-V in FIG. 4. For convenience of description, the holding member 12 is not shown in FIGS. 6A and 6B.

In the optical scanner 1, the piezoelectric elements 31 to 34 undergo contraction and unimorph deformation in the direction of their thicknesses with application of alternating voltage in such a range as not to cause polarization inversion between the upper and lower electrodes Eu and Ed of the piezoelectric elements 31 to 34.

With this in view, a drive voltage is applied to the piezoelectric element 31 to cause the piezoelectric element 31 to extend along its length (in the X-axis direction); and a drive voltage opposite in phase to that applied to the piezoelectric element 31 is applied to the piezoelectric element 32 to induce contraction of the piezoelectric element 32. By so doing, the bending beams 21 and 22 in the unimorphs Ua and Ub, with their one ends coupled to the frame 10, are curved downward and upward, respectively, as shown in FIG. 6A. Similarly, drive voltages with the same phases as applied to the piezoelectric elements 31 and 32 are applied to the piezoelectric elements 33 and 34, respectively, whereby the bending beams 23 and 24 are curved downward and upward, respectively. This gives the mirror 11 a rotary torque acting around the first axis Ay through the torsion bars 13a and 13b, thereby causing the mirror 11 to tilt in a direction Da relative to the first axis Ay as shown in FIG. 6A.

On the other hand, a drive voltage is applied to the piezoelectric element 32 to cause the piezoelectric element 32 to extend along its length (in the X-axis direction); and a drive voltage opposite in phase to that applied to the piezoelectric element 32 is applied to the piezoelectric element 31 to cause contraction of the piezoelectric element 31. By so doing, the bending beams 21 and 22 in the unimorphs Ua and Ub, with their one ends coupled to the frame 10, are curved upward and downward, respectively, as shown in FIG. 6B. Similarly, drive voltages with the same phases as applied to the piezoelectric elements 31 and 32 are applied to the piezoelectric elements 33 and 34, respectively, whereby the bending beams 23 and 24 are curved upward and downward, respectively. This gives the mirror 11 a rotary torque acting around the first axis Ay, through the torsion bars 13a and 13b, thereby causing the mirror 11 to tilt in a direction of rotation Db about the first axis Ay as shown in FIG. 6B.

In this way, the application of alternating drive voltages to the piezoelectric elements 31 to 34 to cause the mirror 11 to turn in the directions Da (FIG. 6A) and Db (FIG. 6B) results in repetitive upward and downward oscillations of the unimorphs Ua to Ud, which oscillations follow the voltages applied. This produces a seesaw-like rotary torque in the torsion bars 13a and 13b, causing the mirror 11 to oscillate through the holding member 12 in a given range of angle. In other words, driving the piezoelectric elements 31 to 34 and thereby causing the mirror 11 to oscillate about the first axis Ay allows the light beam LT reflected off the reflecting surface of the mirror 11 to be scanned in the horizontal direction (the main scanning direction) of the raster scanning RS (FIG. 2).

For cases where the oscillation angle of the mirror 11 is small, the alternating voltages applied to the piezoelectric elements 31 to 34 are made to have a frequency equivalent to the resonant frequency of a mechanical oscillating system in the optical scanner 1. This induces resonant oscillations of the mirror 11, achieving a large angle of deviation (the angle of optical scanning) in terms of the optical scanner 1.

The optical scanner 1, as shown in FIG. 4, further includes four piezoelectric elements (piezoelectric actuators) 35 to 38 on the holding member 12 in a one-to-one correspondence with the piezoelectric elements 31 to 34. The presence of these four allows the mirror 11 to oscillate about the second axis Ax in the same way as it oscillates about the first axis Ay. In other words, driving the piezoelectric elements 35 to 38 on the holding member 12 and thereby causing the mirror 11 to oscillate about the second axis Ax allows a light beam reflected off the reflecting surface of the mirror 11 to be scanned in the vertical direction (the sub-scanning direction) of the raster scanning RS (FIG. 1). The piezoelectric elements 35 to 38 capable of causing the mirror 11 to oscillate about the second axis Ax; and the piezoelectric elements 31 to 34 capable of causing the mirror to oscillate about the first axis Ay, as described above, constitute an actuator part required for the beam raster scanning RS.

The description below is given of a horizontal drive system for driving the mirror 11 of the optical scanner 1 in the horizontal direction (about the first axis Ay) at the frequency of mechanical resonance of the optical scanner 11.

<Horizontal Drive System>

Figure 7:
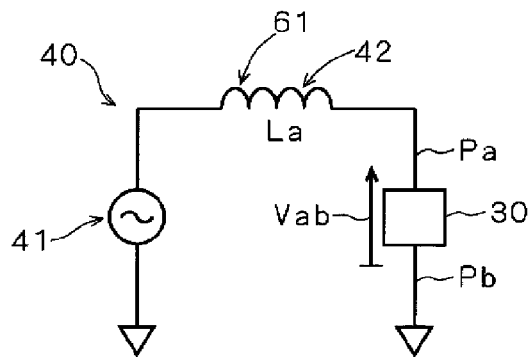
FIG. 7 is a diagrammatic illustration of a horizontal drive system driving the optical scanner in a horizontal direction.

FIG. 7 is a diagrammatic illustration of a horizontal drive system 40 for driving the optical scanner 1 in the horizontal direction.

The horizontal drive system 40 includes a piezoelectric element 30 obtained by a coupled combination of the piezoelectric elements 31 to 34 of the optical scanner 1; and a voltage power supply 41 and an inductor 42 both resulting from equivalent conversion of a horizontal drive circuit 61 (which will be described later) for driving the mirror 11 of the optical scanner 1 in the horizontal direction by the application of drive voltages to the piezoelectric elements 31 to 34. The piezoelectric element 30 is driven with the voltage power supply 41 through the inductor 42 having an inductance value La.

Figure 8:
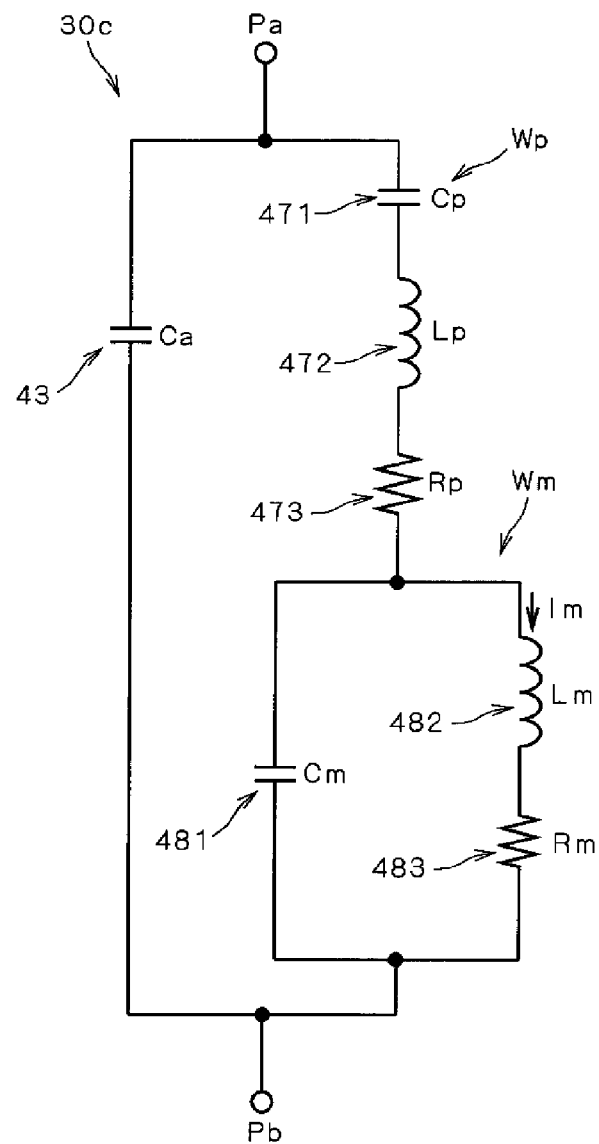
FIG. 8 shows an equivalent circuit converting each mechanical element of the horizontal drive system equivalently into an electrical element.

FIG. 8 shows an equivalent circuit 30c as a result of equivalent conversion of mechanical elements of the horizontal drive system 40 into electrical elements. This equivalent circuit 30c is a circuit when viewed from both ends Pa and Pb of the piezoelectric element 30 (FIG. 7) obtained by a coupled combination of the piezoelectric elements 31 to 34 of the optical scanner 1.

A capacitor 43 represents an electrostatic capacity of the piezoelectric element 30 and has a capacitance value Ca determined depending on the permittivity and shape of a dielectric forming the piezoelectric elements 31 to 34.

A capacitor 471 is an equivalent element of a spring determined by combining the elasticity of the piezoelectric elements 31 to 34 with the elasticity of the bending beams 21 to 24 to which the piezoelectric elements 31 to 34 are attached. This capacitor 471 has a capacitance value Cp, which is the reciprocal of a spring constant.

An inductor 472 is an equivalent element determined by combining the masses of the piezoelectric elements 31 to 34 with the masses of the bending beams 21 to 24, and it has an inductance value Lp.

A resistance 473 is an equivalent element representing internal loss caused by excited oscillations of the piezoelectric elements 31 to 34 and the bending beams 21 to 24, and it has a resistance value Rp.

The capacitor 471, the inductor 472, and the resistance 473 described above constitute a series resonant circuit Wp.

A capacitor 481 is an equivalent element of a spring for the torsion bars 13a and 13b, and it has a capacitance value Cm.

An inductor 482 is an equivalent element corresponding to the moment of inertia of the mirror 11 and the holding member 12, representing an inductance value Lm. Here, current Im flowing through the inductor 482 corresponds to an angular velocity of the oscillatory motion of the mirror 11.

A resistance 483 is an equivalent element representing loss caused in a resonant circuit including the capacitor 481 and the inductor 482 as well as itself, and specifically representing mainly a frictional loss caused by oscillatory motion of the mirror 11 with air.

In the equivalent circuit 30c described above, voltage (corresponding to a rotary torque) applied to the both ends Pa and Pb of the equivalent circuit 30c is divided between the series resonant circuit Wp described above and a parallel resonant circuit Wm configured by the capacitor 481, the inductor 482, and the resistance 483, thereby generating a flow of current Im through the inductor 482, the current Im corresponding to the angular velocity ω of the mirror 11.

Next, the operation of the equivalent circuit 30c is described.

Figure 9:
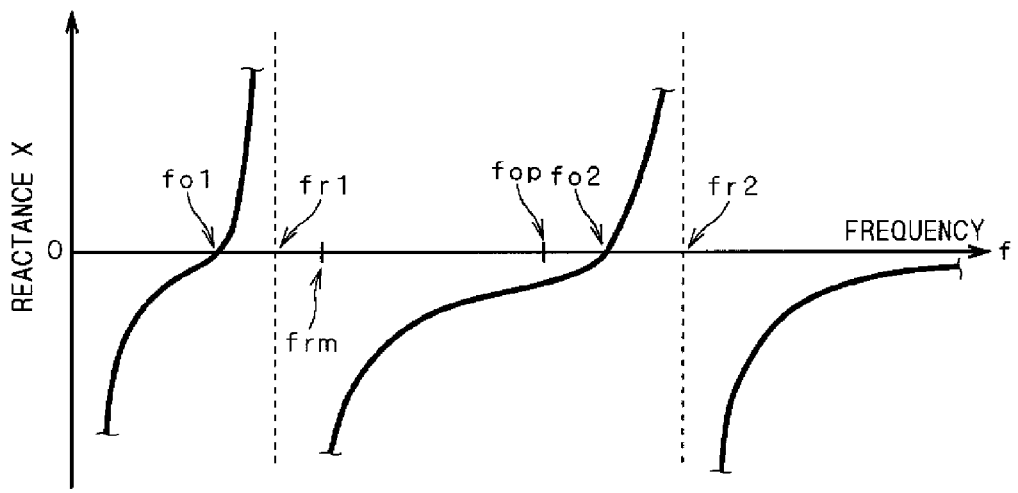
FIG. 9 is a diagrammatic illustration of a frequency characteristic of the equivalent circuit.

FIG. 9 is a diagrammatic illustration of frequency characteristics of the equivalent circuit 30c, showing the relationship between the reactance X and the frequency f for the equivalent circuit 30c. The frequency characteristics shown in FIG. 9 are for the case where any loss caused in the series resonant circuit Wp and in the parallel resonant circuit Wm is disregarded (i.e., for a sufficiently high Q value).

The frequency characteristics of the reactance X is discussed below. The resonant frequency fop of the series resonant circuit Wp corresponding to the unimorphs Ua to Ud is usually set to be sufficiently higher than the resonant frequency frm of the parallel resonant circuit Wm, relevant to the mirror 11. In order to consider a frequency characteristic around the resonant frequency frm of the parallel resonant circuit Wm, the inductor 472 of the series resonant circuit Wp shall be omitted from consideration. Similarly, in order to consider a frequency characteristic around the resonant frequency fop of the series resonant circuit Wp, the inductor 482 of the parallel resonant circuit Wm is omitted from consideration.

The frequencies fo1, fr1, frm, fop, fo2, and fr2 shown in FIG. 9 are obtained, respectively, from the following formulas (1) to (6):

$$fo1 = \frac{1}{2\pi\sqrt{Lm \cdot (Cp + Cm)}} \quad (1)$$

$$fr1 = \frac{1}{2\pi\sqrt{Lm \cdot \left(Cm + \frac{Ca \cdot Cp}{Ca + Cp}\right)}} \quad (2)$$

$$frm = \frac{1}{2\pi\sqrt{Lm \cdot Cm}} \quad (3)$$

$$fop = \frac{1}{2\pi\sqrt{Lp \cdot Cp}} \quad (4)$$

$$fo2 = \frac{1}{2\pi\sqrt{Lp \cdot \frac{Cp \cdot Cm}{Cp + Cm}}} \quad (5)$$

$$fr2 = \frac{1}{2\pi\sqrt{Lp \cdot \left(\frac{Ca \cdot Cp \cdot Cm}{Ca \cdot Cp + Cp \cdot Cm + Cm \cdot Ca}\right)}} \quad (6)$$

At the frequency fo1, the parallel resonant circuit Wm relevant to the mirror 11 becomes inductive, producing series resonance with the capacitor 471, so that a large resonant voltage is developed across the parallel resonant circuit Wm, and a large resonant current Im flows through the inductor 482. That is, at the frequency fo1 corresponding to a mechanical resonant frequency fom which will be described later, the mirror 11 oscillates at a relatively large angular velocity.

This is the mechanical resonance (series resonance) of the mirror 11 in the horizontal direction. In other words, it can be said that each element (the capacitor 471, the inductor 472, the resistance 473, the capacitor 481, the inductor 482, and the resistance 483) is a mechanical series-resonant element having a mechanical resonant frequency fom corresponding to the frequency fo1.

In a series resonant circuit including the inductor 42 (FIG. 7) and the capacitor 43 (FIG. 8), the inductance value La of the inductor (inductance element) 42 is so set that the resonant frequency of the series resonant circuit matches with the mechanical resonant frequency fom. In other words, the horizontal drive circuit 61 (which will be described later) for driving the piezoelectric elements 31 to 34 includes at least one passive element, e.g., the inductance element 42, and is configured by this inductance element 42 and the electrostatic capacities (electrical characteristics) of the piezoelectric elements 31 to 34 to be a series resonant circuit whose resonant frequency is approximately equal to the mechanical resonant frequency fom.

Next described are a configuration and operations of the horizontal drive controller 6a for controlling the horizontal drive system 40 as described above.

<Horizontal Drive Controller 6a>

Figure 10:
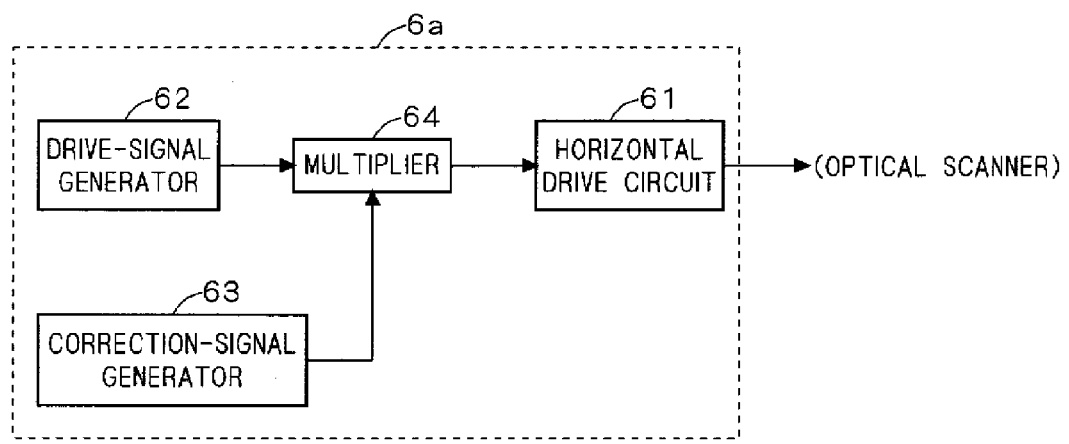
FIG. 10 is a block diagram showing a configuration of the essential parts of a horizontal drive controller.

FIG. 10 is a block diagram showing a configuration of the essential parts of the horizontal drive controller 6a.

The horizontal drive controller 6a includes the horizontal drive circuit 61 driving the optical scanner 1 in the horizontal direction (about the first axis Ay) with application of voltage to the piezoelectric elements 31 to 34; a drive-signal generator 62; a correction-signal generator 63; and a multiplier 64.

Figure 11A:
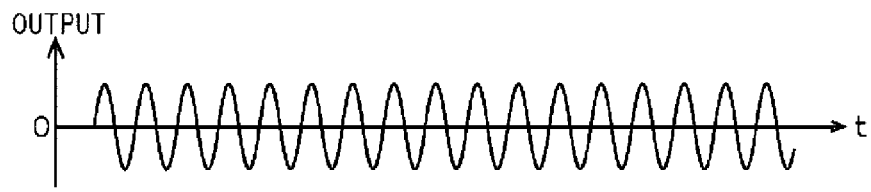
FIGS. 11A and 11B are diagrammatic illustrations of the operations of the horizontal drive controller.

The drive-signal generator 62 outputs, for example, a reference drive signal representing simple harmonic motion as shown in FIG. 11A, for horizontal drive of the optical scanner 1. This reference drive signal has a frequency component around the mechanical resonant frequency fom for oscillatory motion of the mirror 11. The output of this signal induces resonant oscillations of the mirror 11 about the first axis Ay.

The correction-signal generator 63 outputs a correction signal for correcting distortion relevant to a horizontal amplitude that depends on a vertical position in the raster scanning RS shown in FIG. 2 (this distortion is hereinafter referred to as "horizontal distortion in raster scanning"). On design of the optical system, if horizontal distortion in raster scanning is ascertained beforehand, it is possible to generate a correction signal for canceling this distortion. For example, consider the case where, for display of a cross-hatched pattern (lattice pattern) of equal intervals on the screen 9 (FIG. 1), such distortion occurs that the breadth of the displayed image is gradually reduced toward the bottom as shown in (a) in FIG. 12. In this case, as shown in (a) in FIG. 11B, if the correction-signal generator 63 generates a correction signal WH that produces a gradual increase in the output with time t during an image display period Ta in the raster scanning RS, it is possible to display a normal cross-hatched pattern of equal intervals as shown in (b) in FIG. 12.

Figure 11B:
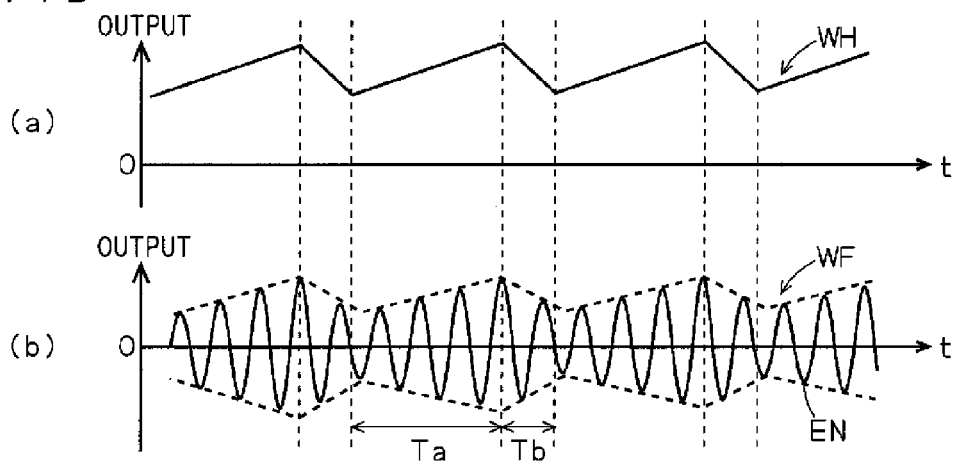

The correction signal WH output from this correction-signal generator 63 is multiplied in the multiplier 64 by the reference drive signal given from the drive-signal generator 62, and a resulting drive signal WF as shown in (b) in FIG. 11B is input to the horizontal drive circuit 61. For example, the multiplier 64 multiplies the reference drive signal shown in FIG. 11A and the correction signal WH shown in (a) in FIG. 11B to generate an amplitude-modulated (AM-modulated) drive signal WF. This drive signal WF has envelopes (envelope curves) EN obtained by arranging the waveform of the correction signal WH in (a) in FIG. 11B symmetrically on either side of a time axis t. More specifically, the amplitude of the drive signal WF increases gradually with time t during the image display period Ta, during which images are displayed on the screen 9 by the raster scanning RS, whereas the amplitude decreases with time t during a vertical blanking interval Tb, during which no image is displayed and a light beam is returned vertically (from bottom to top), i.e., from the end position Qb to the start position Qa of the raster scanning RS (FIG. 1).

This drive signal WF gradually increases in amplitude during the image display period Ta, thereby enabling the breadth of the lower part of a displayed image to increase as compared to that of the upper part of the displayed image in the raster scanning RS. As a result, even a condition of image distortion (horizontal distortion in raster scanning) as shown in (a) in FIG. 12 can be corrected into a normal display condition as shown in (b) in FIG. 12.

As described above, for distortion of a displayed image on the screen 9, the distortion occurring when the piezoelectric elements 31 to 34 are driven to cause oscillatory motion of the mirror 11 based on the reference drive signal (FIG. 11A) for use as a standard drive signal, the correction-signal generator 63 generates a correction signal WH ((a) in FIG. 11B) for correcting this distortion, based on which correction signal the reference drive signal is regulated to generate a drive signal WF ((b) in FIG. 11B). This simplifies correction of horizontal distortion in raster scanning.

Next discussed is the operation of the horizontal drive system 40 when the horizontal drive controller 6a applies voltage to the optical scanner 1 based on the drive signal WF as shown in (b) in FIG. 11B.

Figure 13:
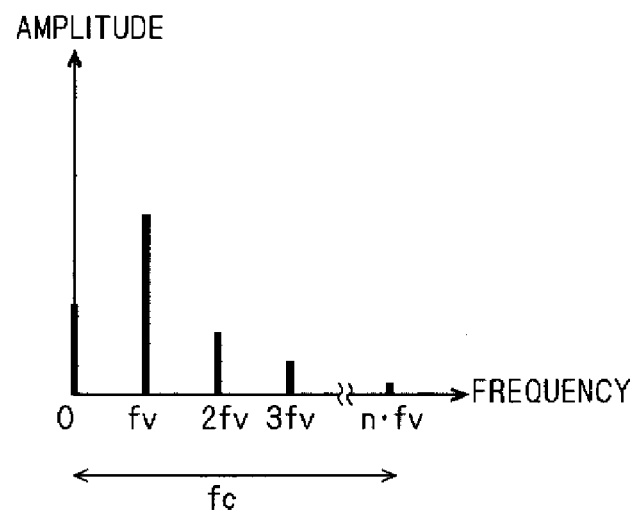
FIG. 13 shows a fundamental frequency and its harmonic frequencies for a Fourier-transformed correction signal.

Fourier expansion of the correction signal WH in (a) in FIG. 11B yields a spectrum consisting of a vertical synchronizing frequency (hereinafter referred to as a "fundamental frequency") fv that is equivalent to the reciprocal of a total time (one cycle) of the image display period Ta and the vertical blanking interval Tb; harmonics that are multiples of the fundamental frequency fv; and a direct current component (FIG. 13). Frequency components up to the n-th harmonic (n·fv) of the fundamental frequency fv are dominant for the correction signal WH, so the dominant frequency band is expressed as fc(=n·fv).

On the other hand, for horizontal drive of the mirror 11 in the optical scanner 1, there is formed a mechanical resonant system having the mechanical resonant frequency fom described above.

Figure 14:
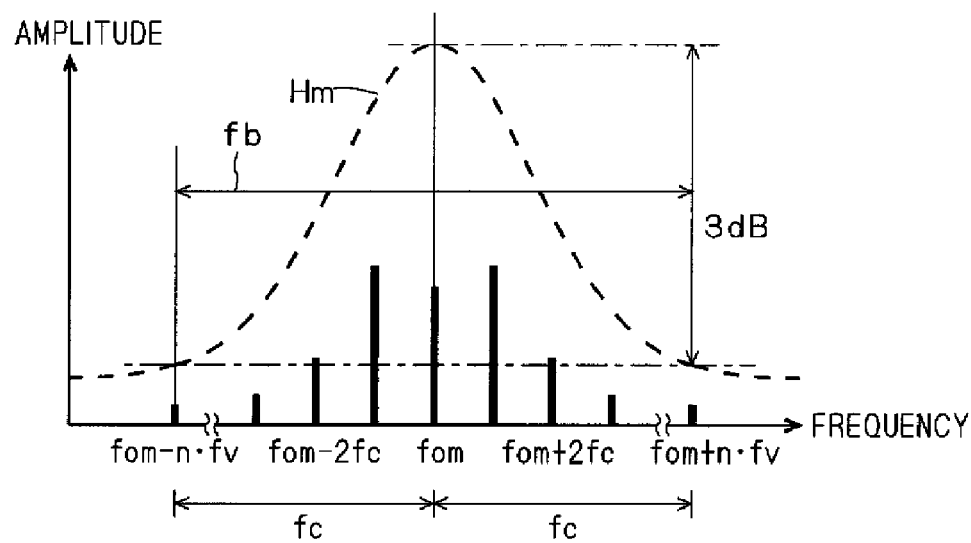
FIG. 14 is a diagrammatic illustration of how the spectrum of the correction signal is affected by a mechanical resonance characteristic.

Thus, in the horizontal drive system 40 including this mechanical resonant system and the horizontal drive controller 6a described above, the spectrum (FIG. 13) of the correction signal WH is affected by a mechanical resonance characteristic Hm having a peak at the mechanical resonant frequency fom as shown in FIG. 14. Specifically, the spectrum of the correction signal WH shown in FIG. 13, overall in the horizontal drive system 40, is expressed such that, as shown in FIG. 14, the frequency band fc in FIG. 13 makes each of upper and lower sidebands of the mechanical resonant frequency fom. Since the spectrum of the correction signal WH undergoes filtering (level reduction or removal) with the mechanical resonance characteristic Hm in its upper and lower sidebands, the degree of reduction in amplitude increases and then dwindles down as the frequency deviates farther from the mechanical resonant frequency fom, as if a kind of band pass filter (BPF) is used.

In other words, the drive signal WF suffers deformation of the envelopes EN ((b) in FIG. 11B) which corresponds to the correction signal WH, by the influence of the mechanical resonance characteristic Hm relevant to the mirror 11, so that it is difficult to correct horizontal distortion in raster scanning in the way as intended by the correction signal WH shown in (a) in FIG. 11B. The following description is given of a technique for inhibiting such deformation of the envelopes EN according to this preferred embodiment.

In the image display apparatus 100A, in order to inhibit deformation of the envelopes EN of the drive signal WF due to the mechanical resonance characteristic Hm, the level of amplitude in the upper and lower sidebands of the mechanical resonant frequency fom is approximately stabilized so that the spectrum of the correction signal WH is in an unchanged condition in those sidebands.

The quality factor Q representing the mechanical resonance characteristic Hm is roughly estimated from the following expression (7), generally using the mechanical resonant frequency fom and a −3 dB frequency passband fb.

$$Q \approx fom/fb \tag{7}$$

Further, in order to approximately stabilize the amplitude level in the sidebands described above, a frequency band 2fc that is equivalent to a sum of the upper and lower sidebands is required to fall within the above −3 dB frequency passband fb. This is given, for example by the following formula (8).

$$2fc = fb \tag{8}$$

From the above expressions (7) and (8), the relationship among the mechanical resonant frequency fom for the mirror 11, the quality factor Q representing the resonance characteristic at the mechanical resonant frequency fom, and the dominant frequency band fc of the correction signal WH is given by the following expression (9). In other words, for approximate stabilization of the amplitude level in the sidebands as described above, the frequency band fc of the correction signal WH is required to satisfy the condition given by the following expression (9) using the mechanical resonant frequency fom and the quality factor Q.

$$fc \approx fom/(2Q) \tag{9}$$

Besides, for further stabilization of the amplitude level in the sidebands described above, the dominant frequency band fc of the correction signal WH may satisfy the condition of fc<fom/(2Q).

Now, for the case where the above frequency band fc is relatively broad (e.g., for the case where the correction of horizontal distortion in raster scanning is sharp relative to time), it is necessary to widen the above −3 dB frequency passband fb. In order to widen this frequency band fb, the mechanical resonant frequency fom should be increased or the quality factor Q should be reduced in the above expression (7). However, there is little room for increasing the mechanical resonant frequency fom, which is determined almost by standards for image signals, and excessive reduction in the quality factor Q may result in the state of mechanical resonant oscillations due to deterioration in sensitivity, disturbances, or the like.

Thus, for the case where the −3 dB frequency passband fb for the mechanical resonance characteristic Hm is relatively narrow, a compensating circuit (e.g., a band-pass filter (BPF)) is provided inside (or outside) the horizontal drive circuit 61 thereby to widen the −3 dB frequency passband fb for a combined characteristic with the mechanical resonance characteristic Hm for the mirror 11. In this case, the relationship between the resulting widened −3 dB frequency passband fa and the upper and lower sidebands (frequency band) 2fc is required to satisfy the condition given by the following expression (10) corresponding to the above expression (8). In other words, the dominant frequency band fc of the frequency components of the correction signal WH should satisfy the condition given by the following expression (10) using the frequency passband fa that is defined by the frequency characteristic obtained by a combination of the electrical characteristic of the horizontal drive circuit 61 for driving the piezoelectric elements 31 to 34 and the mechanical characteristic of oscillatory motion of the mirror 11.

$$fc \approx fa/2 \tag{10}$$

The dominant frequency band fc of the correction signal WH, even if it satisfies the condition of fc<fa/2, brings about a similar effect as given by the above expression (10).

Figure 15:
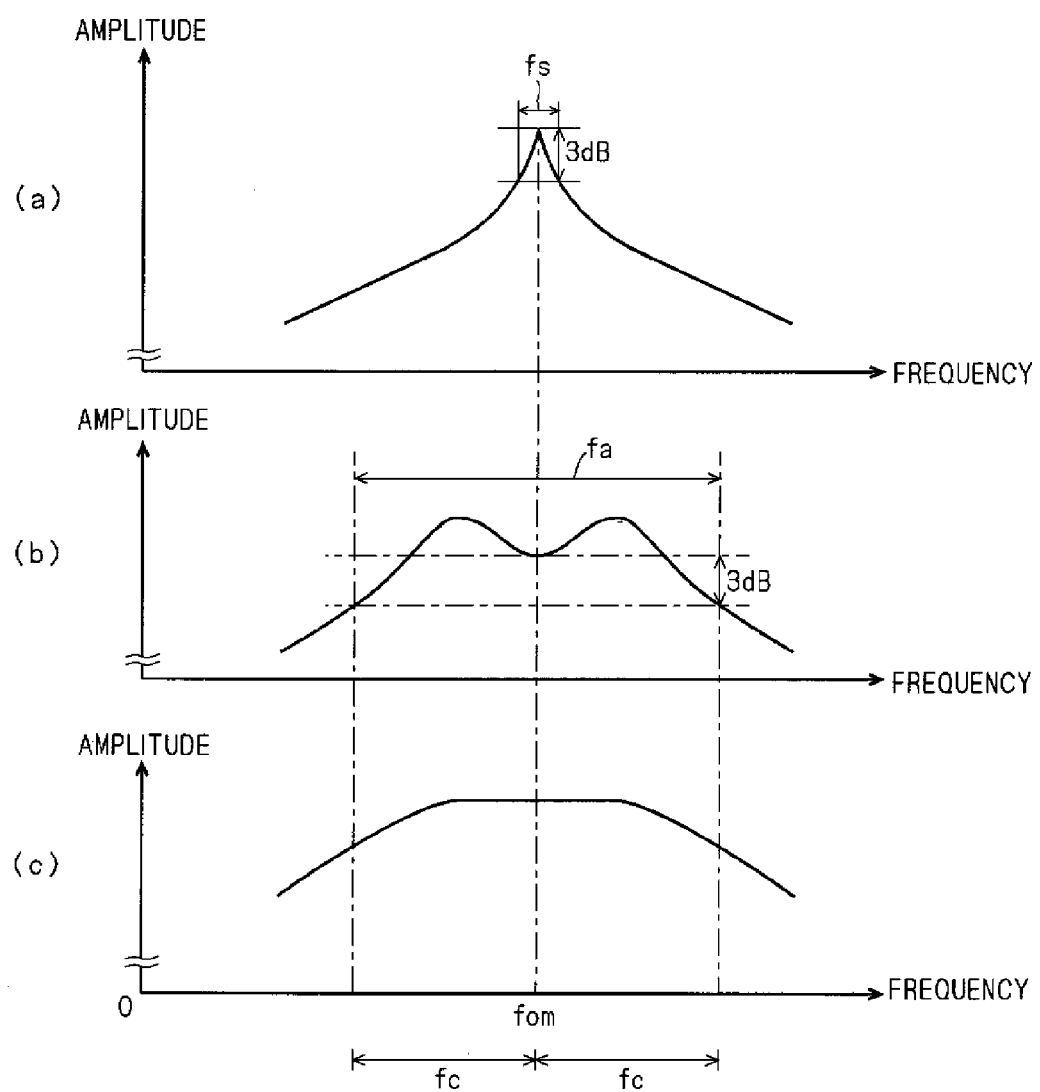
FIG. 15 is a diagrammatic illustration of a bimodal frequency characteristic.

Now referring to the frequency characteristic of a voltage (potential difference) Vab generated across the both ends Pa and Pb of the piezoelectric element 30 by application of voltage from the voltage power supply 41 in the horizontal drive system 40 shown in FIG. 7, the characteristic (resonance characteristic) of the series resonant circuit Wp (FIG. 8) induces the maximum voltage rise (a higher voltage than the applied voltage from the voltage power supply 41) at the mechanical resonant frequency fom, but at the same time, resonance of the parallel resonant circuit Wm (FIG. 8) occurs, reducing impedance. This yields a relatively broad −3 dB frequency passband fa with a bimodal characteristic as shown in (b) FIG. 15. FIG. 15 shows in (a) a resonant frequency characteristic of the current (corresponding to the angular velocity of the mirror 11) Im (FIG. 8) at the time of voltage application from the voltage power supply 41, with a relatively narrow −3 dB frequency passband fs.

Referring to the bimodal characteristic shown in (b) in FIG. 15, it is preferable that a −3 dB frequency passband fa shows a characteristic as flat as possible in the frequency band 2fc, i.e., the upper and lower sidebands, centered at the mechanical resonant frequency fom. It is also desirable that a group delay characteristic ((c) in FIG. 15) relative to the bimodal characteristic shown in (b) in FIG. 15 be as flat as possible.

The requirement for such an improvement in the bimodal characteristic can be met by a horizontal drive circuit 61A (FIG. 16), which is obtained by adding a capacitor 44 and a resistance 45, for use in regulation, in parallel to the horizontal drive circuit 61 (FIG. 7).

Figure 16:
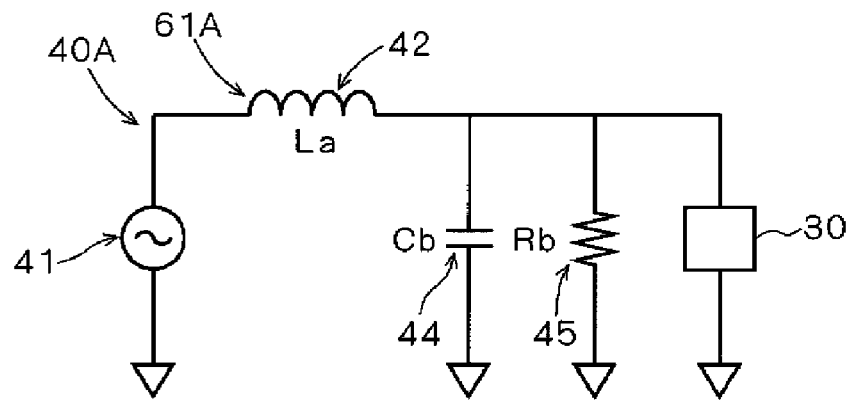
FIG. 16 is a diagrammatic illustration of a horizontal drive system.

For example, the mechanical resonant frequency fom given by the following expression (11) can be varied by controlling the capacitance value Cb of the capacitor 44 in the horizontal drive system 40A shown in FIG. 16. This allows the characteristic of the −3 dB frequency passband fa to be set appropriate to the frequency band 2fc, i.e., the upper and lower sidebands.

$$fom = \frac{1}{2\pi\sqrt{La \cdot (Ca + Cb)}} \tag{11}$$

Further, a loss in the series resonant circuit Wp (FIG. 8) can be varied, for example by controlling the resistance value Rb of the resistance 45 in the horizontal drive system 40A (FIG. 16). This improves the amplitude characteristic and the group delay characteristic relative the above bimodal characteristic into more flat ones.

Figure 12:
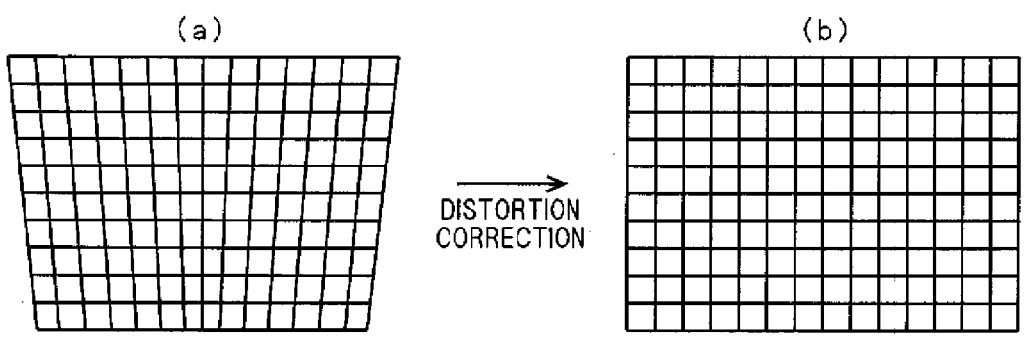
FIG. 12 is a diagrammatic illustration of horizontal distortion in raster scanning.

Through the operation of the image display apparatus 100A described above, for distortion of a displayed image (cf. (a) in FIG. 12) occurring when the piezoelectric elements 31 to 34 are driven to cause oscillatory motion of the mirror 11 based on the reference drive signal (FIG. 11A) representing simple harmonic oscillation, the correction signal WH ((a) in FIG. 11B) for correcting this distortion is generated, based on which correction signal WH the reference drive signal (FIG. 11A) is regulated to generate the drive signal WF ((b) in FIG. 11B). This consequently simplifies distortion in the horizontal direction (the main scanning direction) in raster scanning.

Further, by changing the correction signal WH generated by the correction-signal generator 63, the image display apparatus 100A can readily make fine adjustments of horizontal distortion correction in raster scanning and change or update a correction characteristic by way of temperature compensation for distortion in scanning, or the like.

Second Preferred Embodiment

An image display apparatus 100B according to a second preferred embodiment of the invention has a similar configuration to the image display apparatus 100A shown in FIGS. 1 to 3, but differs in the structure of its horizontal drive controller.

Specifically, a horizontal drive controller 60a in the image display apparatus 100B is configured to store a program or the like for executing operations described below.

<Operation of Horizontal Drive Controller 60a>

Figure 17:
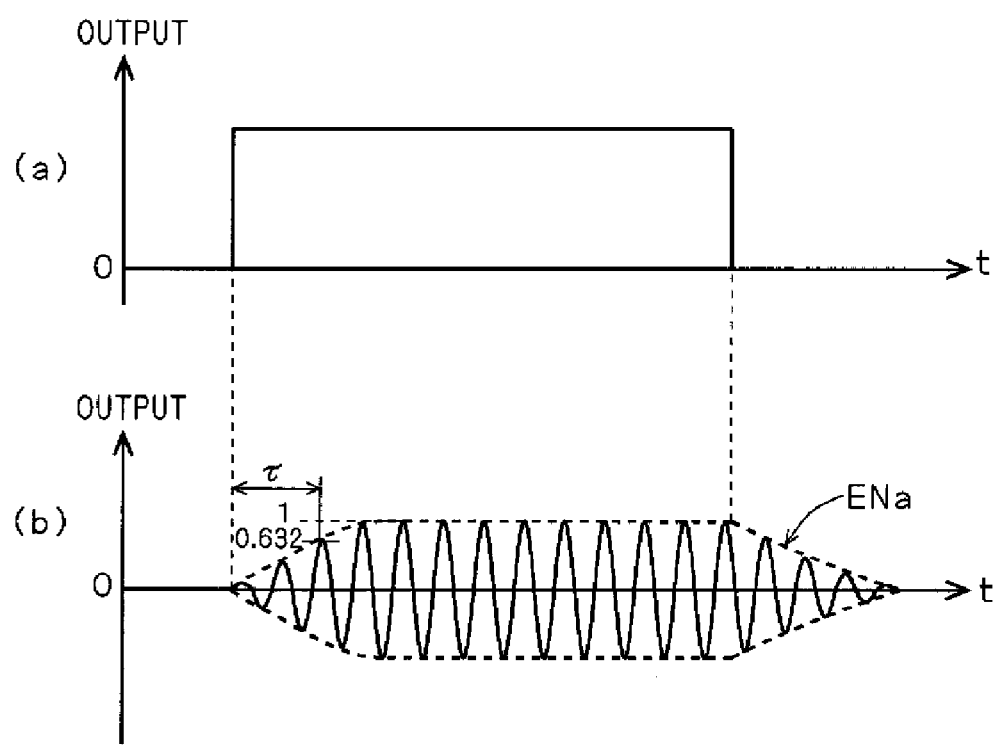
FIG. 17 is a diagrammatic illustration of a delay in the envelope response with respect to a step-like correction signal.

In the image display apparatus 100B, generally as in the case of a mechanical oscillating system with resonance characteristics with a large time constant, when the drive-signal generator 62 (FIG. 10) outputs a drive signal representing simple harmonic oscillation shown in FIG. 11A and the correction-signal generator 63 outputs for example a step-like correction signal shown in (a) in FIG. 17, a resulting response with envelopes ENa to the output of optical scanning of the optical scanner 1 involves, as shown in (b) in FIG. 17, a delay with a mechanical time constant τ of the mechanical oscillating system.

More specifically, for the case where the correction-signal generator 63 generates a correction signal with sharp changes like the step-like correction signal shown in (a) in FIG. 17, a time delay occurs before the response of the mechanical oscillating system to the output of optical scanning in the image display apparatus follows a target value. Referring to the image display apparatus 100B, for example as shown in (a) in FIG. 11B, the correction signal WH makes a sharp change (have discontinuity) at the time of transition from the vertical blanking interval Tb to the image display period Ta, thereby having, as shown in (a) in FIG. 18, a period Tc with an envelope ENb representing sluggish output of optical scanning. That is, during a given period Tc after the transition from the vertical blanking interval Tb to the image display period Ta shown in (a) in FIG. 18, the envelope ENb as a response of the mechanical oscillating system does not settle to the correction signal (target value) and fails to follow the target value at the beginning of the image display period Ta. In order to improve such a situation, the image display apparatus 100B devises a method of operating the horizontal drive controller 60a, which method is now described.

Figure 19:
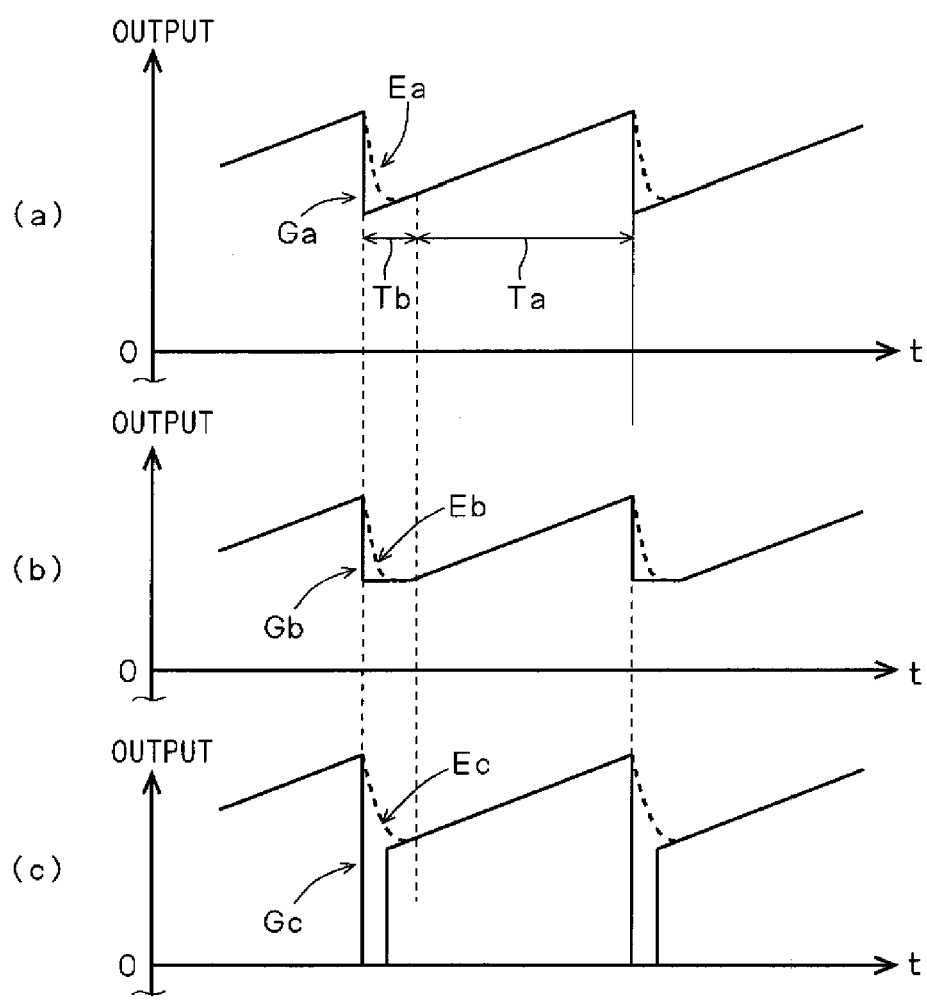
FIG. 19 is a diagrammatic illustration of an operation of a horizontal drive controller according to a second preferred embodiment of the invention.

FIG. 19 is a diagrammatic illustration of the operation of the horizontal drive controller 60a.

In the image display apparatus 100B, the correction-signal generator 63 of the horizontal drive controller 60a provides a control signal that causes the envelope of the output of optical scanning to suddenly attenuate immediately after the transition from the image display period Ta to the vertical blanking interval Tb. More specifically, as shown in (a) in FIG. 19, during the vertical blanking interval Tb, a control signal Ga causes the envelope Ea of the output response to follow the correction signal by the beginning of the next image display period Ta, so that the envelope Ea can smoothly join the target value (correction signal) at the beginning of the next image display period Ta. This allows the envelope of the output response to settle to the target value (the correction signal) within the vertical blanking interval Tb, thereby improving the effect of distortion correction with the correction signal.

In other words, in the raster scanning that is a repetition of scanning during the image display period Ta for image display on the screen 9; and scanning during the vertical blanking interval (non-display period) Tb, the correction-signal generator 63 generates a correction signal including the control signal (specific signal) Ga that causes a transient response, occurring at the time of transition from the scanning during the vertical blanking interval Tb to the scanning during the image display period Ta, to come to converge during the vertical blanking interval Tb. This allows the response to be settled to the drive signal (target value) by the end of the vertical blanking interval Tb.

The control signal given during the vertical blanking interval Tb is not necessarily the control signal Ga as shown in (a) in FIG. 19; it may be a control signal Gb as shown in (b) in FIG. 19 or a control signal Gc as shown in (c) FIG. 19. Specifically, as shown in (b) in FIG. 19, the control signal Gb causing an envelope of the output response to suddenly attenuate immediately after the end of the image display period Ta may be provided so that an envelope Eb can join the target value (the correction signal) from the beginning of the image display period Ta. Or, for an envelope with low responsivity, as shown in (c) in FIG. 19, the control signal Gc causing the output of the correction signal to instantaneously decline to zero may be provided immediately after the end of the image display period Ta so that an envelope Ec can join the target value (the correction signal) from the beginning of the next image display period Ta. As another alternative, a signal of opposite phase below zero may be instantaneously provided as a control signal. The control signals Gb and Gc described above allow an envelope of the output response to be settled to the target value (the correction signal) within the vertical blanking interval Tb, thereby improving the effect of distortion correction with the correction signal.

Through the operation described above, the image display apparatus 100B achieves a similar effect to that of the image display apparatus 100A of the first preferred embodiment. Further, the image display apparatus 100B adds a control signal causing the output response to follow a target drive value from the beginning of the image display period Ta, to the correction signal in the vertical blanking interval Tb. The provision of this control signal allows the response to the output of optical scanning during the image display period Ta to follow the drive signal (the correction signal) from the beginning of the image display period Ta, thereby achieving proper image display during the image display period Ta.

Figure 18:
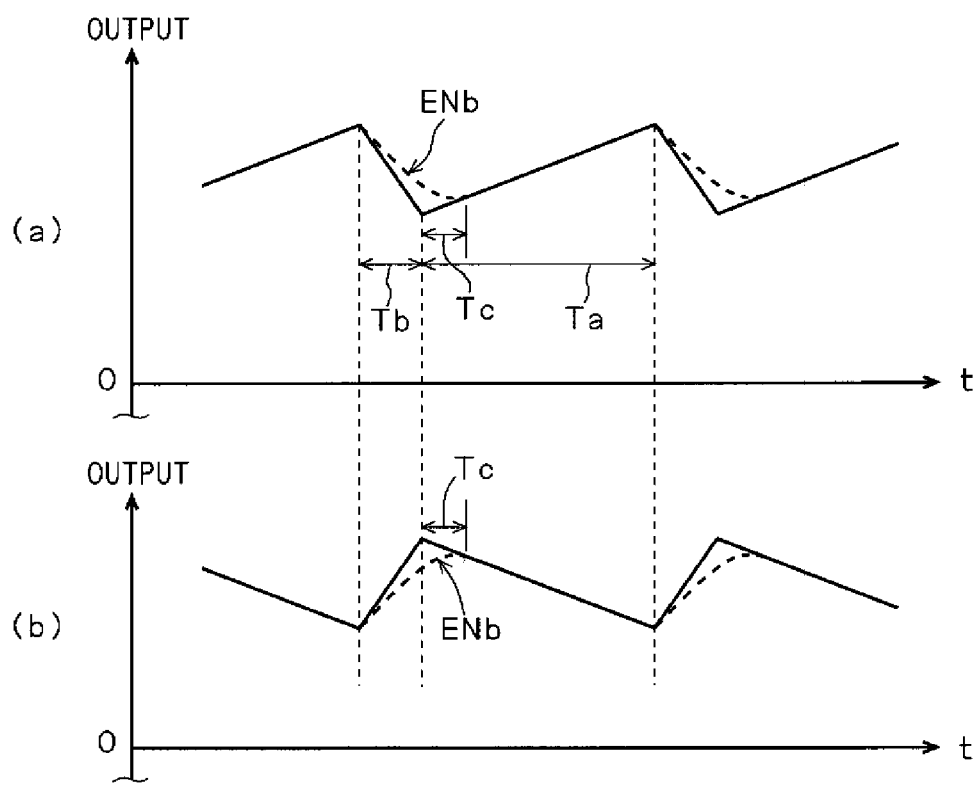
FIG. 18 shows a period of a gentle envelope with respect to the correction signal.
Figure 20:
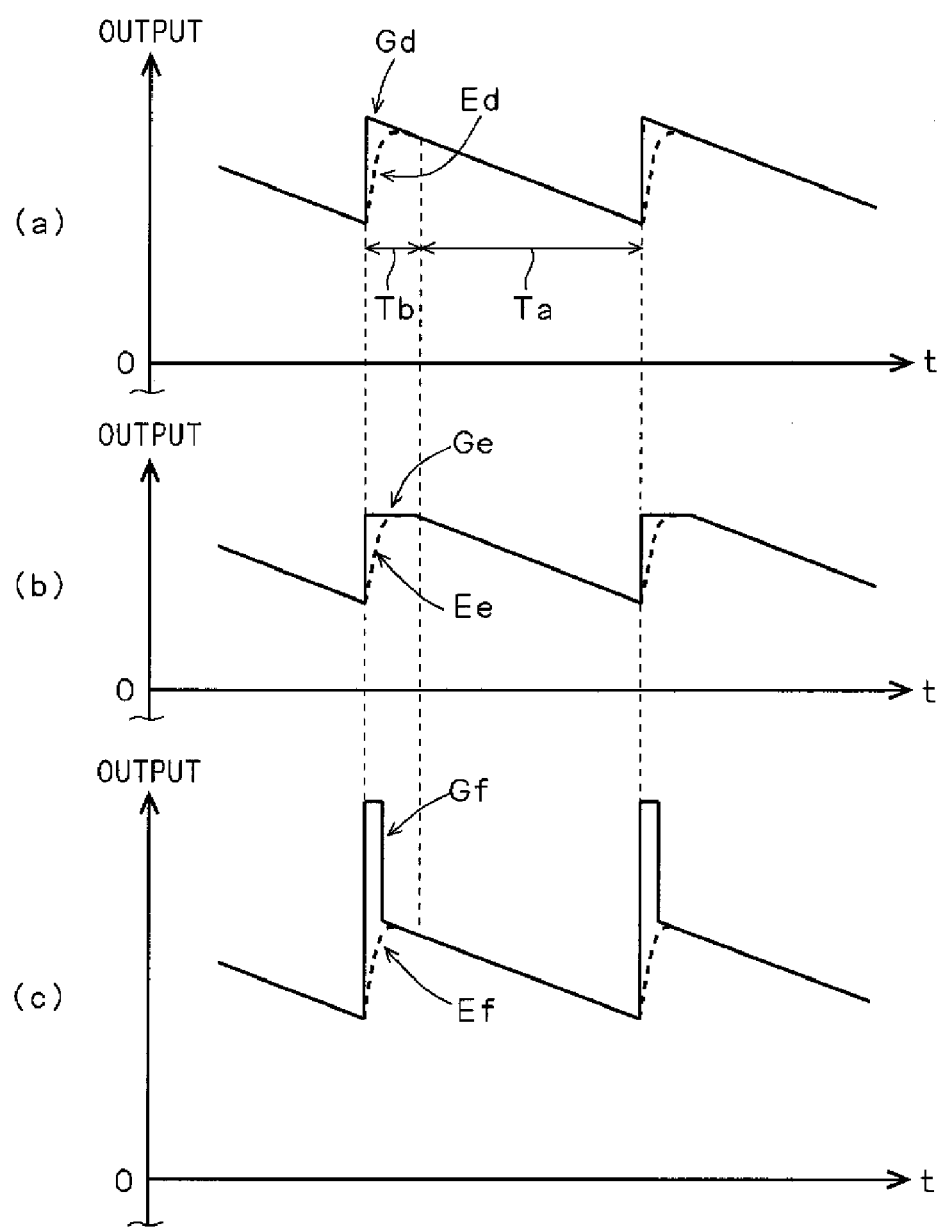
FIG. 20 is a diagrammatic illustration of different operations of the horizontal drive controller.

In the image display apparatus 100B, as shown in (b) in FIG. 18, the period Tc described by a gentle envelope ENb also appears when the correction-signal generator 63 generates a correction signal reducing its output level gradually with time t during the image display period Ta. In this case also, control signals Gd to Gf shown in (a) to (c) in FIG. 20 should be given, like the control signals Ga to Gc described above. More specifically, as shown in (a) and (b) in FIG. 20, the control signals Gd and Ge causing an envelope of the output response to suddenly rise immediately after the end of the image display period Ta should be provided so that envelopes Ed and Ee can join the target value (the correction signal) from the beginning of the image display period Ta. Or, for an envelope with low responsivity, as shown in (c) in FIG. 20, the control signal Gf causing the output of the correction signal to suddenly rise instantaneously should be provided immediately after the end of the image display period Ta so that an envelope Ef can join the target value (the correction signal) from the beginning of the next image display period Ta. Providing the control signals Gd to Gf described above allow the envelopes of the output response to be settled to the target value (the correction signal) within the vertical blanking interval Tb, thereby improving the effect of distortion correction with the correction signal.

Figure 21:
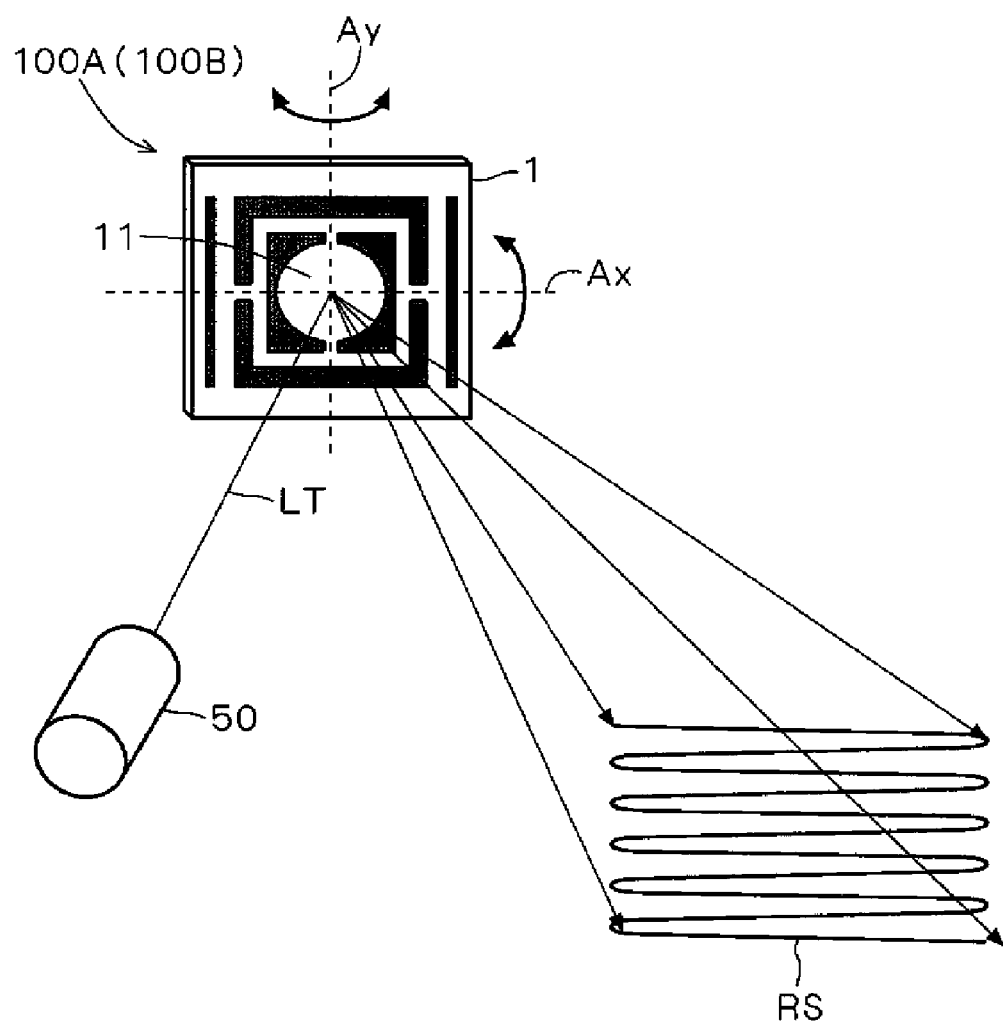
FIG. 21 is a diagrammatic illustration of the optical scanner in another position.

Alternatively, in the image display apparatuses 100A and 100B according to the first and second preferred embodiments, the optical scanner 1 shown in FIG. 2 may be in a position turned 90 degrees as viewed from the front, specifically in a position as shown in FIG. 21, for raster scanning of the light beam LT from the light source 50. The optical scanner 1 in such a position (FIG. 21) can reduce the moment of inertia of the movable part with respect to the horizontal direction, in which direction the movable part is driven at a higher speed than in the vertical direction in the raster scanning RS.

Third Preferred Embodiment

An image display apparatus according to a third preferred embodiment of the invention is analogous in its configuration to the image display apparatuses 100A and 100B of the first and second preferred embodiments shown in FIGS. 1 and 3, but it differs in the configuration of its optical scanner.

<Configuration of Essential Parts of Optical Scanner>

FIG. 22 is a plan view showing a configuration of the essential parts of an optical scanner 101 according to the third preferred embodiment of the invention. The optical scanner 101 is configured by a so-called MEMS (Micro Electro Mechanical Systems) mirror made by micromachining of a silicon chip. In the following description, the optical scanner 101 is also referred to as an MEMS mirror 101 where appropriate.

The optical scanner 101 mainly includes a mirror 110, two torsion bars 121 and 122, a movable frame 130, an actuator part consisting of four piezoelectric elements (piezoelectric actuators) 151 to 154, four erection parts 141 to 144, four narrow coupling parts 130a to 130d, and a fixed frame 170.

The fixed frame 170, fixed to the casing of the image display apparatus 100C, is a frame having four sides and four plate parts disposed in approximately a rectangular shape. Its outer and inner edges form approximately a square with diagonal lines, namely a- and b-axes, approximately orthogonal to each other. Also, its inner edges make approximately a square space.

The two erection parts 141 and 143 are coupled to the inside of the corner of the fixed frame 170 on the positive side of the b-axis (the upper part in FIG. 22); specifically, the erection part 141 is provided along one side of the fixed frame 170 situated on the negative a-axis side and on the positive b-axis side (the upper left in FIG. 22); and the erection part 143 is provided along one side of the fixed frame 170 on the positive a-axis side and on the positive b-axis side (the upper right in FIG. 22). The two erection parts 142 and 144 are coupled to the inside of the corner of the fixed frame 170 on the negative side of the b-axis (the lower part in FIG. 22); specifically, the erection part 142 is provided along one side of the fixed frame 170 situated on the negative a-axis side and on the negative b-axis side (the lower left in FIG. 22); and the erection part 144 is provided along one side of the fixed frame 170 situated on the positive a-axis side and on the negative b-axis side (the lower right in FIG. 22).

The piezoelectric elements 151 to 154 are bonded to the erection parts 141 to 144, respectively, along the directions of extension of the erection parts 141 to 144. The erection part 141 and the piezoelectric element 151 form an extensible erection part 161 extending from the inside of the corner of the fixed frame 170 on the positive b-axis side (the upper part in FIG. 22) in the −a and −b directions (in the lower-left direction in FIG. 22); the erection part 142 and the piezoelectric element 152 form an extensible erection part 162 extending from the inside of the corner of the fixed frame 170 on the negative b-axis side (the lower part in FIG. 22) in the −a and +b directions (in the upper-left direction in FIG. 22); the erection part 143 and the piezoelectric element 153 form an extensible erection part 163 extending from the inside of the corner of the fixed frame 170 on the positive b-axis side (the upper part in FIG. 22) in the +a and −b directions (in the lower-right direction in FIG. 22); and the erection part 144 and the piezoelectric element 154 form an extensible erection part 164 extending from the inside of the corner of the fixed frame 170 on the negative b-axis side (the lower part in FIG. 22) in the +a and +b directions (in the upper-right direction in FIG. 22).

The extensible erection parts 161 and 162 are spaced at a given distance from each other with the a-axis in between; and the extensible erection parts 163 and 164 are spaced at a given distance from each other with the a-axis in between.

The end of extensible erection part 161 closer to the a-axis is coupled to the movable frame 130 via the narrow coupling part 130a; the end of the extensible erection part 162 closer to the a-axis is coupled to the movable frame 130 via the narrow coupling part 130b; the end of the extensible erection part 163 closer to the a-axis is coupled to the movable frame 130 via the narrow coupling part 130c; and the end of the extensible erection part 164 closer to the a-axis is coupled to the movable frame 130 via the narrow coupling part 130d.

The movable frame 130, like the fixed frame 170, is a frame having four sides and four plate parts disposed in approximately a rectangular shape. Its outer edges form approximately a square with diagonal lines, namely a- and b-axes, approximately orthogonal to each other, and its inner edges make a hexagonal space.

The torsion bar 121 is provided on the inside of the corner of the movable frame 130 on the positive side of the b-axis (the upper part in FIG. 22) to extend in the −b direction (the downward direction in FIG. 22); and the torsion bar 122 is provided on the inside of the corner of the movable frame 130 on the negative side of the b-axis (the lower part in FIG. 22) to extend in the +b direction (the upward direction in FIG. 22).

The mirror 110 is coupled to the end of the torsion bar 121 which is not coupled to the movable frame 130 and to the end of the torsion bar 122 which is not coupled to the movable frame 130. In other words, the torsion bars 121 and 122 support the mirror 110 in such a manner as to sandwich the mirror 110 in the +b and −b directions. That is, the movable frame 130 supports the mirror 110 as well as the torsion bars 121 and 122.

The mirror 110 is a reflecting mirror of approximately a square shape having, as outer edges, two sides approximately parallel to the a-axis and two sides approximately parallel to the b-axis, and it is disposed in about the center of the optical scanner 101 to reflect a laser beam for projection.

The two torsion bars 121 and 122, small in thickness and having a thin long shape, undergoes elastic deformation relatively easily. Also, the narrow coupling parts 130a to 130d undergoes elastic deformation relatively easily because of their thin and narrow shapes.

Now a concrete description is given of rotary motion of the mirror 110. Application of voltage to the piezoelectric elements 151 to 154 where appropriate changes the lengths of the piezoelectric elements 151 to 154 depending on the voltage applied, so that the erection parts 141 to 144 with the piezoelectric elements 151 to 154 attached thereto expand and/or contract in the directions of extension. That is, the extensible erection parts 161 to 164 expand and/or contract in the directions of extension. From this, for example when the voltage applied to the piezoelectric elements 151 and 153 and the voltage applied to the piezoelectric elements 152 and 154 are opposite in polarity, i.e., when voltages of opposite phases are applied to the piezoelectric elements 151 and 153 and the piezoelectric elements 152 and 154, the mirror 110 turns around the a-axis. On the other hand, for example when the voltage applied to the piezoelectric elements 151 and 152 and the voltage applied to the piezoelectric elements 153 and 154 are opposite in polarity, i.e., when voltages of opposite phases are applied to the piezoelectric elements 151 and 152 and the piezoelectric elements 153 and 154, the mirror 110 turns around the b-axis.

Then, a drive signal causing the mirror 110 to turn around the a-axis and a drive signal causing the mirror 110 to turn around the b-axis are superimposed on each other and applied to the four piezoelectric elements 151 to 154. This signal application induces resonant drive of the mirror 110 around the b-axis where the torsion bars 121 and 122 serve as a fulcrum, and drive of the mirror 110 to turn the movable frame 130 together with the mirror 110 and the torsion bars 121 and 122 around the a-axis. From this, although being a single device with a single mirror 110, the optical scanner 101 can make both a low-speed turning motion about the a-axis and a high-speed turning motion about the b-axis utilizing resonant drive. That is, the light beam LT (FIG. 2) from the light source 50 is deflected in two different directions, so that the light beam LT (FIG. 2) can simultaneously be subjected to both horizontal and vertical scanning on the screen 9 (FIG. 1). In other words, the actuator part 150 provided with the four piezoelectric elements 151 to 154 includes a first oscillating part for oscillating the mirror (movable part) 110, which reflects the light beam LT emitted from the light source 50, around the b-axis for horizontal scanning of the light beam LT; and a second oscillating part for causing the mirror 110 around the a-axis intersecting with the b-axis at approximately a right angle for vertical scanning of the light beam LT. Two-dimensional scanning, where horizontal and vertical scanning are performed simultaneously, using only a single device is preferable from the viewpoint of reducing the number of parts of the optical scanner 101, and also from the viewpoints of reducing the manufacturing cost and work required for device adjustment.

By effecting the same operation as those of the horizontal drive controllers 6a and 60a in the first and second preferred embodiments, the optical scanner 101 with the above-described configuration can also achieve the same effect as described in the first and second preferred embodiments.

While, in the third preferred embodiment, two-dimensional scanning of the light beam LT (FIG. 2) from the light source 50 (FIG. 1) can be achieved by turning one mirror 110 about the two axes (the a-axis and the b-axis) appropriately orthogonal to each other, the present invention is not limited thereto; horizontal and vertical scanning of a light beam may be achieved by turning two separate mirrors, for two-dimensional scanning of the light beam LT from the light source 50. One concrete example of such a configuration is that a first actuator oscillating a first mirror (first movable part) around an a'-axis, the first mirror reflecting the light beam LT from the light source 50, and a second actuator oscillating a second mirror (second movable part) around a b'-axis, the second mirror reflecting the light beam LT reflected off the first mirror, are located sequentially in space on an optical path from the light source 50 to the screen 9 (FIG. 1). In order to achieve horizontal and vertical scanning, it is preferable that both the a'- and b'-axes be approximately orthogonal to a line inside and along the optical path from the light source 50 to the screen 9 (more preferably, a center line of the optical path), and that, as to the relative positions and angles of the a'- and b'-axes, for example, the a'- and b'-axes be spaced at a given distance from each other along the center line of the optical path described above and be rotated about 90 degrees around the center line of the optical path described above. In other words, it is preferable that the b'-axis be spaced at a given distance from the a'-axis along a given straight line approximately orthogonal to the a'-axis, and be rotated about 90 degrees around the given straight line.

<Modifications>

In the preferred embodiments described above, the use of a reference drive signal representing simple oscillatory motion as shown in FIG. 11A is not a necessity, and a rectangular reference drive signal with a constant frequency as shown in FIG. 23A may be used. In the case of using such a rectangular reference drive signal, a pulse-width-modulated (PWM) signal shown in FIG. 23B should be used as a drive signal equivalent to the drive signal WF shown in (b) in FIG. 11B in order to achieve distortion correction in the horizontal direction (the main scanning direction) in raster scanning.

In the optical scanner of the preferred embodiments described above, the use of a piezoelectric element as an actuator causing oscillatory displacement of the mirror 11 or 110 is not a necessity, and other actuators may be used, such as an electromagnetic actuator, e.g., VCM; an electrostatic actuator, e.g., an electrostatic vibrator; and an actuator using high polymers.

In the preferred embodiments described above, the use of an optical scanner with two oscillatory axes for beam raster scanning is not a necessity; instead, a pair of optical scanners each having one oscillatory axis may be used for raster scanning. In this case also, beam raster scanning is feasible by oscillating mirrors, provided as movable parts in the pair of optical scanners, on the axes of the optical scanners intersecting with each other at approximately a right angle.

While the invention has been shown and described in detail, the foregoing description is in all aspects illustrative and not restrictive. It is therefore understood that numerous modifications and variations can be devised without departing from the scope of the invention.

What is claimed is:

1. An image display apparatus capable of displaying an image on a given plane of projection by beam raster scanning, the image display apparatus comprising:
   (a) an actuator part capable of causing a movable part to oscillate about a first axis and a second axis, said movable part having a reflecting surface reflecting a light beam emitted from a given light source, said second axis intersecting with said first axis at approximately a right angle; and
   (b) a main scanning unit driving said actuator part based on a drive signal having a frequency component around a resonant frequency relevant to oscillatory motion of said movable part, to cause said movable part to oscillate about said first axis, thereby scanning said light beam reflected off said reflecting surface in a main scanning direction of said raster scanning,
   said main scanning unit including:
   (b-1) a correction-signal generator generating a correction signal for use in correcting distortion of a displayed image on said given plane of projection, said distortion occurring when said actuator part is driven based on a reference drive signal for use as said drive signal to cause said movable part to oscillate about said first axis; and
   (b-2) a regulator regulating said reference drive signal based on said correction signal to generate said drive signal,
   said image display apparatus further comprising:
   (c) a sub-scanning unit driving said actuator part to cause said movable part to oscillate about said second axis, thereby scanning said light beam reflected off said reflecting surface in a sub-scanning direction of said raster scanning.

2. The image display apparatus according to claim 1, wherein
   a dominant frequency band fc relevant to frequency components of said correction signal satisfies: fc≈fom/(2Q) or fc<fom/(2Q),
   where fom is said resonant frequency and Q is a quality factor representing a resonance characteristic relevant to said resonant frequency.

3. The image display apparatus according to claim 1, wherein
   a dominant frequency band fc relevant to frequency components of said correction signal satisfies: fc≈fa/2 or fc<fa/2, where fa is a given frequency passband defined by a frequency characteristic obtained by a combination of an electrical characteristic of a drive circuit for driving said actuator part and a mechanical characteristic relevant to the oscillatory motion of said movable part.

4. The image display apparatus according to claim 1, wherein said actuator part includes at least one piezoelectric actuator, a drive circuit for driving said piezoelectric actuator includes at least one passive element and is configured as a resonant circuit whose resonant frequency is approximately equal to said resonant frequency, by said at least one passive element and an electrical characteristic of said at least one piezoelectric actuator.

5. The image display apparatus according to claim 4, wherein said at least one passive element is an inductance element.

6. The image display apparatus according to claim 1, wherein said sub-scanning unit repeats scanning during a display period in which image display is performed on said given plane of projection, and scanning during a non-display period in which said image display is not performed, and said correction-signal generator generates a correction signal including a specific signal that causes a transient response occurring at a time of transition from said scanning during said non-display period to said scanning during said display period, to come to converge within said non-display period.

7. The image display apparatus according to claim 6, wherein said specific signal allows a response occurring in said display period to follow said drive signal from the beginning of said display period.

8. An image display apparatus capable of displaying an image on a given plane of projection by beam raster scanning, the image display apparatus comprising:

(a) a first actuator causing a first movable part to oscillate about a first axis, said first movable part having a first reflecting surface reflecting a light beam emitted from a given light source;

(b) a second actuator causing a second movable part to oscillate about a second axis, said second movable part having a second reflecting surface reflecting said light beam reflected off said first reflecting surface; and (c) a main scanning unit driving said first actuator based on a drive signal having a frequency component around a resonant frequency relevant to oscillatory motion of said first movable part, to cause said first movable part to oscillate about said first axis, thereby scanning said light beam reflected off said first reflecting surface in a main scanning direction of said raster scanning, said main scanning unit including:

(c-1) a correction-signal generator generating a correction signal for use in correcting distortion of a displayed image on said given plane of projection, said distortion occurring when said first actuator is driven based on a reference drive signal for use as said drive signal, to cause oscillatory motion of said first movable part about said first axis; and (c-2) a regulator regulating said reference drive signal based on said correction signal to generate said drive signal, said image display apparatus further comprising:

(d) a sub-scanning unit driving said second actuator to cause said second movable part to oscillate about said second axis, thereby scanning said light beam reflected off said second reflecting surface in a sub-scanning direction of said raster scanning.

9. An image display apparatus capable of displaying an image on a given plane of projection by beam raster scanning, the image display apparatus comprising:

(a) a first actuator causing a first movable part to oscillate about a first axis, said first movable part having a first reflecting surface reflecting a light beam emitted from a given light source;

(b) a second actuator causing a second movable part to oscillate about a second axis, said second movable part having a second reflecting surface reflecting said light beam reflected off said first reflecting surface; and (c) a main scanning unit driving said second actuator based on a drive signal having a frequency component around a resonant frequency relevant to oscillatory motion of said second movable part, to cause said second movable part to oscillate about said second axis, thereby scanning said light beam reflected off said second reflecting surface in a main scanning direction of said raster scanning, said main scanning unit including:

(c-1) a correction-signal generator generating a correction signal for use in correcting distortion of a displayed image on said given plane of projection, said distortion occurring when said second actuator is driven, based on a reference drive signal for use as said drive signal, to cause oscillatory motion of said second movable part about said second axis; and (c-2) a regulator regulating said reference drive signal based on said correction signal to generate said drive signal, said image display apparatus further comprising:

(d) a sub-scanning unit driving said first actuator to cause said first movable part to oscillate about said first axis, thereby scanning said light beam reflected off said first reflecting surface in a sub-scanning direction of said raster scanning.

10. An image display apparatus configured for displaying an image on a plane of projection by beam raster scanning, the image display apparatus comprising:

a movable part having a reflecting surface for reflecting a light beam emitted from a light source;

an actuator configured with said movable part so as to cause said movable part to oscillate about a first axis and a second axis as a result of actuation thereof, said second axis intersecting with said first axis at approximately a right angle; and a main scanning unit which is electrically connected to said actuator and which is adapted to drive said actuator based on a drive signal having a frequency component around a resonant frequency relevant to oscillatory motion of said movable part to thereby cause said movable part to oscillate about said first axis so that when a light beam is reflected off said reflecting surface during oscillation said light is reflected off said reflecting surface in a main scanning direction of said raster scanning; and a sub-scanning unit which is electrically connected to said actuator and which is adapted to drive said actuator to thereby cause said movable part to oscillate about said second axis so that when a light beam is reflected off said reflecting surface during oscillation said light beam is reflected off said reflecting surface in a sub-scanning direction of said raster scanning;

wherein said main scanning unit includes:
a correction-signal generator configured to generate a correction signal adapted to, in combination with a reference drive signal, to correct optical distortion of a displayed image on a plane of projection; and
a regulator which is configured to regulate a reference drive signal based on said correction signal and to thereby generate a drive signal adapted to drive said main scanning unit in a manner so as to correct optical distortion of a displayed image on a plane of projection.

11. The image display apparatus according to claim 10, wherein
a dominant frequency band fc relevant to frequency components of said correction signal satisfies: fc≈fom/(2Q) or fc<fom/(2Q),
where fom is said resonant frequency and Q is a quality factor representing a resonance characteristic relevant to said resonant frequency.

12. The image display apparatus according to claim 10, wherein
a dominant frequency band fc relevant to frequency components of said correction signal satisfies: fc≈fa/2 or fc<fa/2,
where fa is a given frequency passband defined by a frequency characteristic obtained by a combination of an electrical characteristic of a drive circuit for driving said actuator and a mechanical characteristic relevant to the oscillatory motion of said movable part.

13. The image display apparatus according to claim 10, wherein
said sub-scanning unit is configured to repeat scanning during a display period in which image display is performed on a plane of projection and during a non-display period in which said image display is not performed, and said correction-signal generator generates a correction signal including a specific signal that is adapted to cause a transient response occurring at a time of transition from said scanning during said non-display period to said scanning during said display period.

14. The image display apparatus according to claim 13, wherein
said specific signal is adapted to cause a response occurring in said display period to follow said drive signal from the beginning of said display period.

15. The image display apparatus according to claim 10, wherein said regulator is configured to generate said drive signal based on a product of said reference drive signal and said correction signal.

16. The image display apparatus according to claim 15, further comprising an angle detector configured to detect an angle of oscillation of said moving part about said first axis and a resonance-point detector configured to detect a resonant frequency of oscillatory motion of said moving part.

17. The image display apparatus according to claim 16, wherein said correction-signal generator is configured to generate a correction signal having an amplitude that gradually increases with time during an image display period and having an amplitude that decreases with time during a vertical blanking period during raster scanning.

18. The image display apparatus according to claim 16, wherein said correction-signal generator is configured to generate a correction signal having an amplitude that gradually decreases with time during an image display period and having an amplitude that increases with time during a vertical blanking period during raster scanning.

* * * * *